(12) United States Patent
Mitani et al.

(10) Patent No.: US 9,158,251 B2
(45) Date of Patent: Oct. 13, 2015

(54) FILM AND IMAGE HEATING DEVICE USING FILM

(71) Applicant: CANON KABUSHIKI KAISHA, Tokyo (JP)

(72) Inventors: Takanori Mitani, Tokyo (JP); Akimichi Suzuki, Yokohama (JP); Kazuhiro Doda, Yokohama (JP); Satoshi Nishida, Numazu (JP); Isamu Takeda, Yokohama (JP); Akira Okano, Kawasaki (JP); Masahiro Suzuki, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/467,294

(22) Filed: Aug. 25, 2014

(65) Prior Publication Data

US 2015/0063885 A1   Mar. 5, 2015

(30) Foreign Application Priority Data

Aug. 30, 2013 (JP) ................................. 2013-178924
Aug. 30, 2013 (JP) ................................. 2013-178925
Aug. 30, 2013 (JP) ................................. 2013-178926

(51) Int. Cl.
*G03G 15/20* (2006.01)

(52) U.S. Cl.
CPC ........ *G03G 15/2064* (2013.01); *G03G 15/2053* (2013.01); *G03G 2215/2048* (2013.01)

(58) Field of Classification Search
CPC combination set(s) only.
See application file for complete search history.

(56) References Cited

U.S. PATENT DOCUMENTS

| | | | |
|---|---|---|---|
| 5,217,532 A | 6/1993 | Sasame et al. | |
| 5,309,210 A | 5/1994 | Yamamoto et al. | |
| 7,932,310 B2 | 4/2011 | Gallucci et al. | |
| 8,811,872 B2 | 8/2014 | Nakagawa et al. | |
| 2005/0136261 A1* | 6/2005 | Tani ........................... | 428/411.1 |
| 2007/0065615 A1 | 3/2007 | Odle et al. | |
| 2007/0066737 A1 | 3/2007 | Gallucci et al. | |
| 2007/0066739 A1 | 3/2007 | Odle et al. | |
| 2007/0066740 A1 | 3/2007 | Odle et al. | |
| 2007/0066741 A1 | 3/2007 | Donovan et al. | |
| 2007/0066765 A1 | 3/2007 | Aneja et al. | |
| 2007/0197739 A1 | 8/2007 | Aneja et al. | |
| 2007/0219324 A1 | 9/2007 | Aneja et al. | |
| 2010/0303520 A1 | 12/2010 | Miyauchi et al. | |

FOREIGN PATENT DOCUMENTS

| | | |
|---|---|---|
| JP | 1-147579 A | 6/1989 |
| JP | 3-025481 A | 2/1991 |
| JP | 10-063123 A | 3/1998 |
| JP | 2000-296552 A | 10/2000 |
| JP | 2006-137937 A | 6/2006 |
| JP | 2008-197317 A | 8/2008 |
| JP | 2009-508997 A | 3/2009 |

(Continued)

*Primary Examiner* — Clayton E Laballe
*Assistant Examiner* — Jas Sanghera
(74) *Attorney, Agent, or Firm* — Fitzpatrick, Cella, Harper & Scinto

(57) ABSTRACT

A cylindrical film used in an image heating device heating a recording material, on which an image has been formed, has a resin layer, this resin layer being made from a resin in which a crystalline resin and an amorphous resin having a higher glass transition temperature than the crystalline resin are blended, wherein a volume ratio of the crystalline resin with respect to the amorphous resin in the resin layer is 70/30 to 99/1.

22 Claims, 21 Drawing Sheets

(56) References Cited

FOREIGN PATENT DOCUMENTS

| JP | 2010-031107 A | 2/2010 |
| WO | 2006/041186 A1 | 4/2006 |
| WO | 2007/035402 A2 | 3/2007 |
| WO | 2010/137728 A1 | 12/2010 |

* cited by examiner

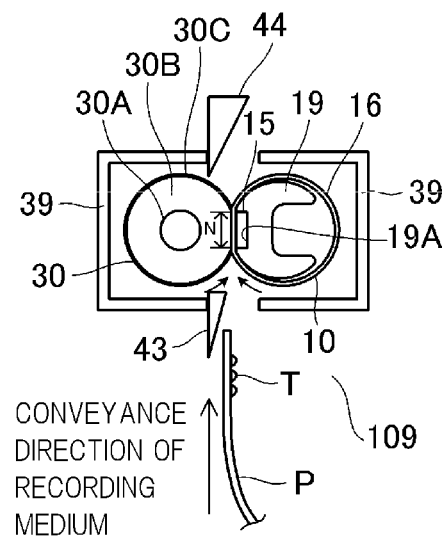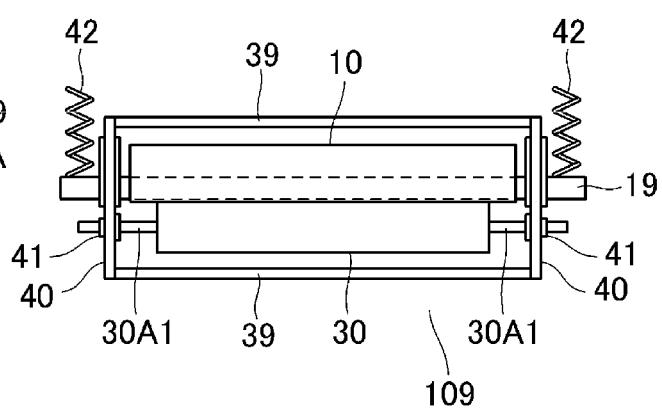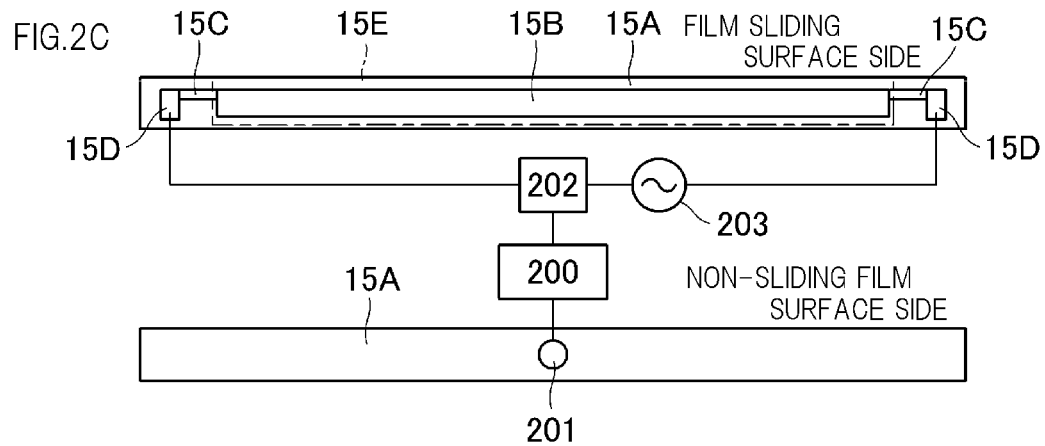

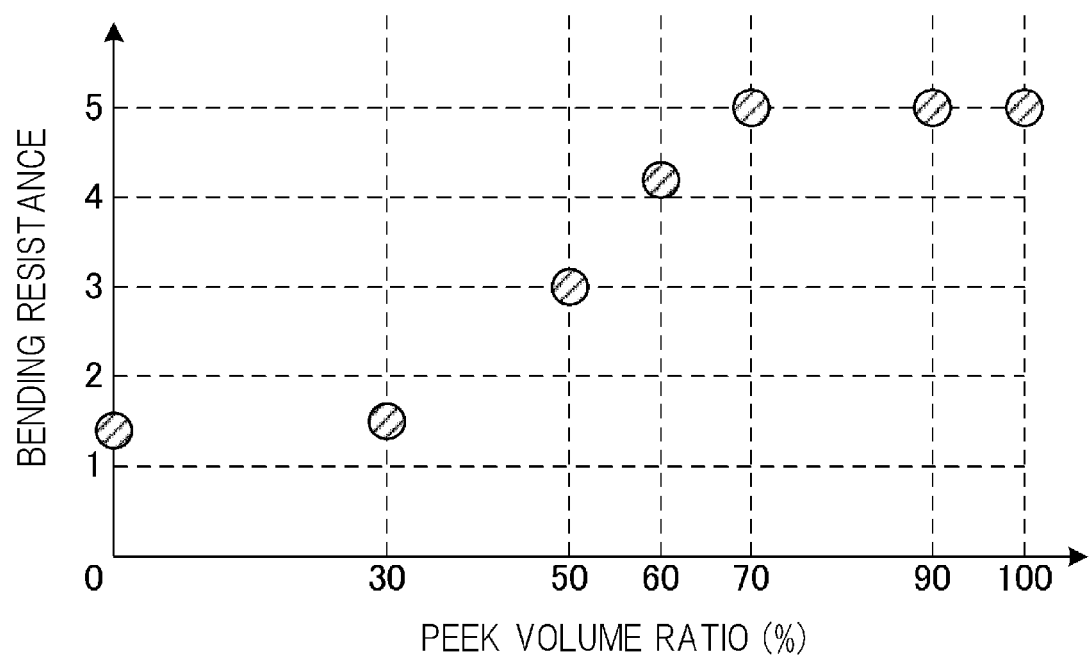

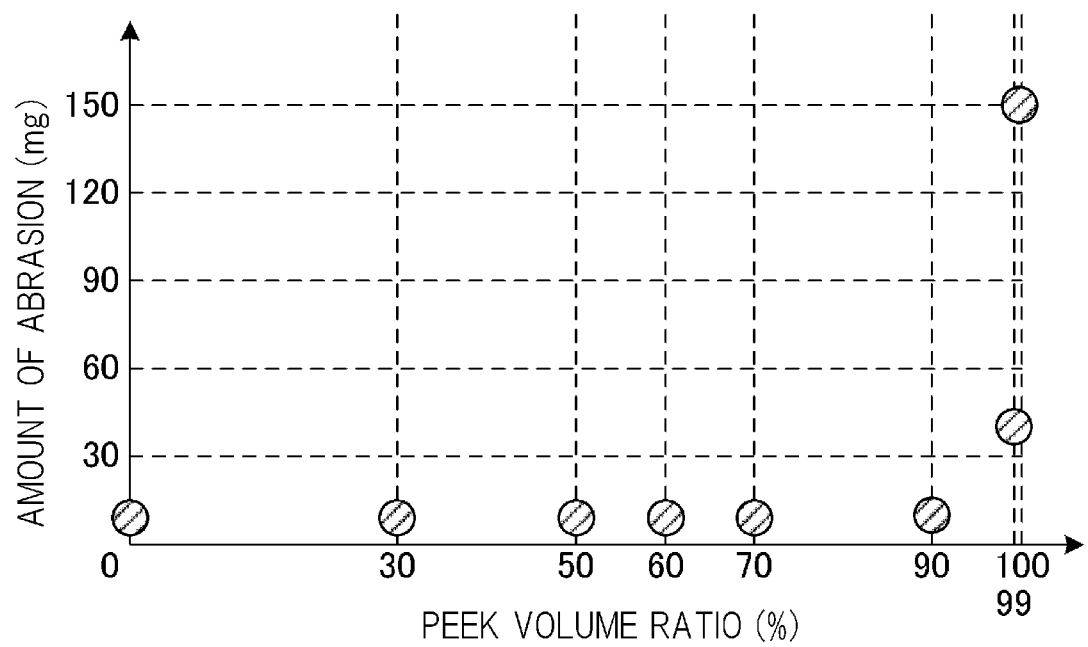

FILM AND IMAGE HEATING DEVICE USING FILM

BACKGROUND OF THE INVENTION

1. Field of the Invention

The present invention relates to a film which is used in an image heating device, such as a fixing apparatus.

2. Description of the Related Art

An image-forming apparatus, such as an electrophotographic copying machine, electrophotographic printer, or the like, is provided with an image-forming unit which forms a toner image on a recording medium, and a fixing apparatus (image heating device) which carries out a heating process so as to fix the toner image onto the recording medium, for instance. The fixing apparatus forms a nip portion between a fixing rotating member and a pressing rotating member which rotate in pressurized contact with each other, whereby a recording medium on which an unfixed toner image has been formed by the image-forming unit is heated while being gripped and conveyed, thereby fixing the toner image onto the recording medium.

In a fixing apparatus of this kind, conventionally, a heat-resistant thin-film fixing film, for example, is used as a fixing rotating member or a pressurizing rotating member. Japanese Patent Application Publication No. 3-25481 discloses using a thermoplastic resin, such as polyether ether ketone (PEEK), polyether sulfone (PESU), polyether imide (PEI), or the like, as material for the fixing film. A thermoplastic resin can employ a method of manufacturing such as extrusion molding, and therefore has an advantage in that it can be produced inexpensively compared to a thermosetting resin.

However, if a thermoplastic resin is used as the material for a fixing film, then there is a concern that fatigue cracks may occur due to the insufficient bending resistance. On the other hand, if a thermoplastic film is used as the material of the fixing film, then there is a possibility of increase in the abrasion of the inner circumferential surface of the film due to insufficient abrasion resistance, and there are concerns about the occurrence of slipping of the fixing film due to the resistance caused by the abrasive dust.

SUMMARY OF THE INVENTION

One preferred embodiment of the invention of the present application is a cylindrical film used in an image heating device heating a recording medium on which an image has been formed, the cylindrical film comprising:

a resin layer, this resin layer being made from a resin in which a crystalline resin and an amorphous resin having a higher glass transition temperature than the crystalline resin are blended, wherein a volume ratio of the crystalline resin with respect to the amorphous resin in the resin layer is 70/30 to 99/1.

Second preferred embodiment of the invention of the present application is an image heating device performing a heating process for heating while conveying a recording material on which an image has been formed in a nip portion, comprising:

a cylindrical film, this film having a resin layer made from a resin in which a crystalline resin and an amorphous resin having a higher glass transition temperature than the crystalline resin are blended;

a nip portion forming member that contacts an inner surface of the film; and a back-up member that forms the nip portion together with the nip portion forming member, via the film, wherein a volume ratio of the crystalline resin with respect to the amorphous resin in the resin layer is 70/30 to 99/1.

Third preferred embodiment of the invention of the present application is a cylindrical film used in an image heating device heating a recording material on which an image has been formed, comprising:

a resin layer in which crystalline polyaryl ketone and an amorphous resin having a higher glass transition temperature than the crystalline polyaryl ketone are blended, wherein the resin layer has two or more glass transition temperatures measured by differential scanning calorimetric measurement.

Fourth preferred embodiment of the invention of the present application is a cylindrical film used in an image heating device heating a recording material on which an image has been formed, comprising:

a resin layer made from crystalline thermoplastic resin, the degree of crystallinity of the resin layer being not less than 81% of the maximum saturated degree of crystallinity of the crystalline thermoplastic resin.

Further features of the present invention will become apparent from the following description of exemplary embodiments (with reference to the attached drawings).

BRIEF DESCRIPTION OF THE DRAWINGS

FIGS. 2A to 2C are diagrams showing a configuration of a fixing apparatus relating to an embodiment of the present invention;

FIG. 6 is a diagram representing the volume ratio of PEEK and the bending resistance;

FIG. 8 is a diagram representing the volume ratio of PEEK and the amount of abrasion;

DESCRIPTION OF THE EMBODIMENTS

First Embodiment (1) Image-Forming Apparatus

Figure 1:
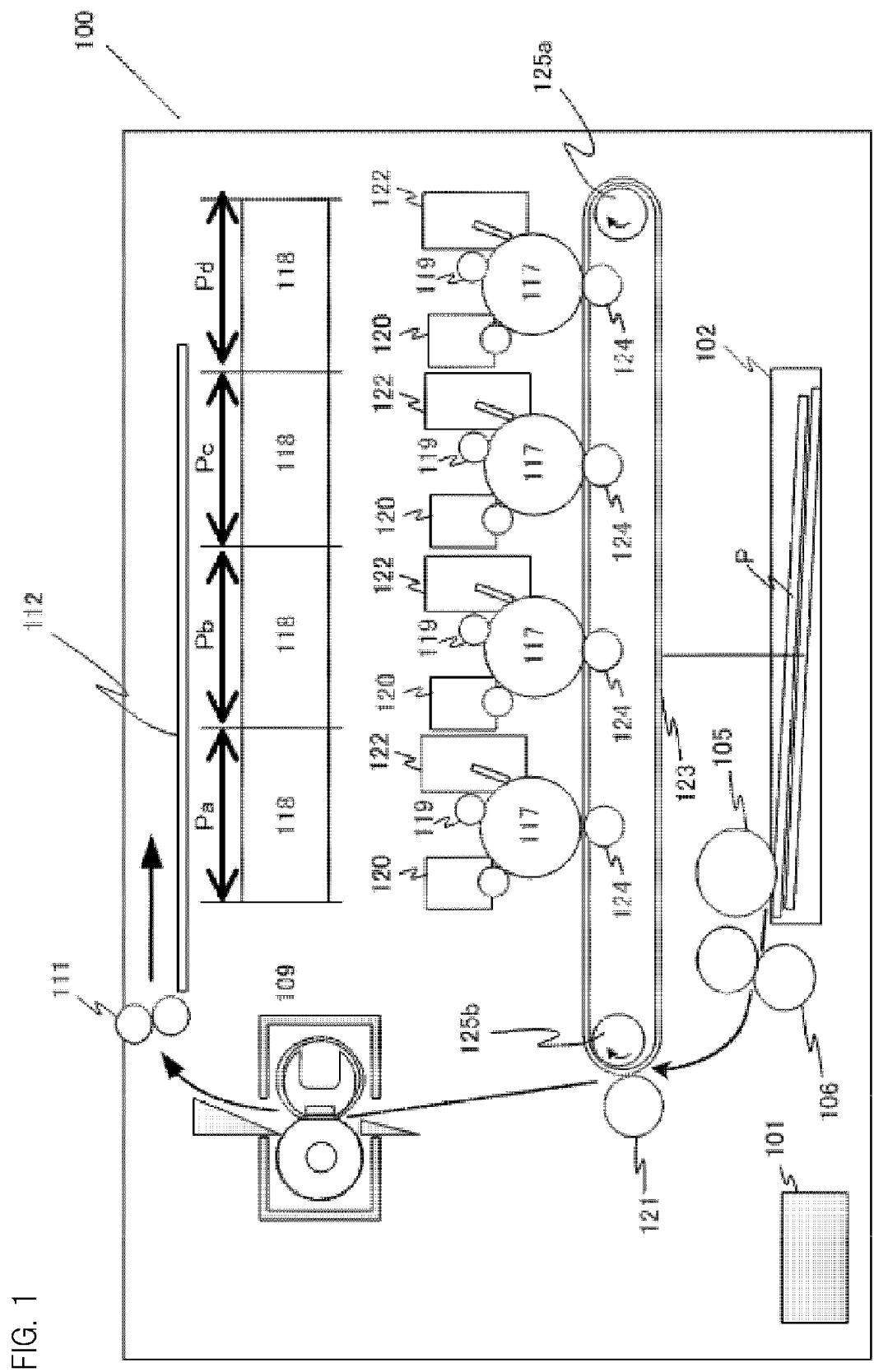
FIG. 1 is a general cross-sectional diagram of an image-forming device relating to an embodiment of the present invention.

FIG. 1 is a schematic cross-sectional diagram showing the schematic composition of an image-forming apparatus (full-color printer) 100 relating to the embodiment of the present invention. Here, the image-forming apparatus forms an image on a recording medium, by developer (toner), using an electrophotographic image forming process. For example, the image-forming apparatus includes an electrophotographic copying machine, an electrophotographic printer (LED printer, laser beam printer, etc.), an electrophotographic facsimile apparatus, an electrophotographic word processor, or a machine combining these (multi-function printer), and the like. Furthermore, the recording medium is an article on which an image is formed, and is, for example, recording paper, an OHP sheet, a plastic sheet, cloth, or the like.

The image-forming unit which forms a toner image on the recording medium P is composed by four image-forming stations Pa, Pb, Pc, Pd. The image-forming stations each have a photosensitive body 117, a charging member 119, a lens scanner 118, a developer 120, a transfer member 124, and a cleaner 122 for cleaning the photosensitive body. Moreover, the image-forming unit has a belt (intermediate transfer member) 123 which holds and conveys the toner image, and a secondary transfer roller 121 which transfers a toner image from the belt 123 onto the recording medium P. The operation of the abovementioned image-forming unit is well-known, and therefore detailed explanation thereof is omitted here.

The recording medium P is paid out, one sheet at a time, from the cassette 102, by the rotation of the roller 105, and this recording member P is conveyed to a secondary transfer nip portion which is formed by the belt 123 and the secondary transfer roller 121, due to the rotation of the roller 106. The belt 123 is spanned tensely between a tensioning roller 125a and a secondary transfer opposing roller 125b, and is rotated by the rotation of these rollers. The secondary transfer opposing roller 125b is made to contact the secondary transfer roller 121 via the belt 123, whereby the abovementioned secondary transfer nip portion is formed. The recording medium P to which an unfixed toner image has been transferred in the secondary transfer nip portion is conveyed to the fixing unit 109, whereby the toner image is heated and fixed. The recording medium P exiting the fixing unit 109 is discharged onto a tray 112 by the rotation of the roller 111.

(2) Fixing Unit (Fixing Apparatus) 109

The fixing apparatus which constitutes the fixing unit 109 will now be described with reference to FIGS. 2A to 2C. FIG. 2A is a cross-sectional diagram showing the schematic composition of the fixing apparatus 109 relating to the present embodiment. FIG. 2B is a front view diagram showing the fixing apparatus 109 relating to the present embodiment from the upstream side in terms of the direction of conveyance of the recording medium. FIG. 2C is a diagram showing the schematic configuration of a ceramic heater 15 of the fixing apparatus 109 relating to the present embodiment.

The fixing apparatus 109 has a heating unit 10 and a pressurizing roller 30 forming a pressurizing member. The heating unit 10 includes a tubular film (endless film) 16, a film guide 19 forming a supporting member, and a ceramic heater (heat source) 15, or the like, forming a nip portion forming member. The film 16, the film guide 19, the ceramic heater (called "heater" below) 15 and the pressurizing roller 30 are each members which are long in the direction perpendicular to the direction of conveyance of the recording medium (see FIG. 2A).

The heater 15 which forms a heat generating member is supported on the film guide 19, and the tubular film 16 having flexibility is fitted loosely onto the outside of the film guide 19. By gripping the film 16 between the heater 15 and the pressurizing roller 30, a nip portion N is formed by the film 16 and the pressurizing roller 30.

Below, the respective members are described in more detail. The pressurizing roller 30 has a round axle-shaped core metal core (axle section) 30A made from a metal material such as iron, stainless steel, aluminum, or the like. An elastic layer 30B having silicone rubber, or the like, as a main component, is formed in a roller shape on the outer circumferential surface between the support shaft sections 30A1 on either end portion of the metal core 30A in the lengthwise direction (see FIG. 2B). Moreover, a separating layer 30C having PTFE, PFA or FEP, or the like, as a main component is formed on the outer circumferential surface of the elastic layer 30B. The support shaft sections 30A1 on either end of the metal core 30A in the lengthwise direction are supported rotatably via bearings 41 on left and right side plates 40 which constitute a portion of the metal frame 39 of the fixing apparatus 109.

The film guide 19 is formed with a substantially concave lateral cross-section, using a prescribed heat-resistant material. A groove 19A is formed along the lengthwise direction in the flat surface of film guide 19 on the side of the pressurizing roller 30. This groove supports the heater 15.

The heater 15 has a thin plate-shaped heater base plate 15A of which the main component is a ceramic, such as alumina, aluminum nitride, or the like. An electric heat generating resistance 15B of which the main component is silver, palladium, or the like, is printed as a pattern along the lengthwise direction of the heater base plate, on a film sliding surface of the heater base plate 15A on the side of the film 16. Furthermore, a conducting section 15C for passing current to the electric heat generating resistance 15B and an electrode section 15D for supplying current to the electric heat generating resistance via the conducting section are printed as a pattern on the film sliding surface. Furthermore, a protective layer 15E of which the main component is glass or fluorine resin, or a heat-resistant resin, such as polyimide, is provided on the film sliding surface so as to cover the electric heat generating resistance 15B.

The film 16 is formed in a cylindrical shape in such a manner that the inner circumferential length of the film is longer than the outer circumferential length of the film guide 19, and is loosely fitted externally onto the film guide in a tension-free state. The layer configuration and the material of the film 16 is described below.

The film 16 fitted externally onto the film guide 19 is arranged in parallel with the pressurizing roller 30, and the film guide 19 is impelled in a horizontal direction in which the respective ends in the lengthwise direction intersect perpendicularly with the bus direction of the pressurizing roller via pressurizing springs 42. The heater 15 supported by the film guide 19 causes the film 16 to make contact with the outer circumferential surface (front surface) of the pressurizing roller 30 in a pressurized state, due to the pressing force of the pressurizing springs 42. Thereby, the elastic layer 30B of the pressurizing roller 30 is sunken and elastically deformed, and a nip portion N of a prescribed width (see FIG. 2A) is formed between the surface of the pressurizing roller 30 and the outer circumferential surface (front surface) of the film 16.

In FIG. 2A, reference numeral 43 is a guide which guides a recording medium P to a nip portion N. Reference numeral 44 is a guide which guides a recording medium P output from a nip portion N.

Referring to FIGS. 2A and 2C, a heating and fixing process operation of the fixing apparatus 109 will be described. The drive force of a motor (not illustrated) provided in the image-forming apparatus is transmitted to a gear (not illustrated) provided in the end portion of the lengthwise direction of the metal core 30A of the pressurizing roller 30, whereby the pressurizing roller 30 is caused to rotate in the direction of the arrow. The film 16 rotates in the direction of the arrow in accordance with the rotation of the pressurizing roller 30, while the inner circumferential surface (inner surface) of the film 16 slides against the protective layer 15E of the heater 15.

Current is passed through the heat generating resistance 15B of the heater 15 via a triac 202, by a commercial power source 203, whereby the conductive heating resistance generates heat and the heater warms up. The triac 202 is controlled by a control unit 200 consisting of a CPU and a memory such as a RAM, ROM, or the like, in such a manner that the detection temperature of the temperature detection element 201 that monitors the temperature of the non-sliding film surface of the heater base plate 15A is maintained at a fixed temperature (target temperature).

The recording medium P which bears an unfixed toner image T is guided to the nip portion N by the guide 43. While the recording medium P is gripped and conveyed by the nip portion N, the heat of the heater 15 and the pressure of the nip portion are applied to the unfixed toner image T, whereby the unfixed toner image T is heated and fixed onto the recording medium P. The recording medium P exiting the nip portion N is guided by the guide 44 and sent to the roller 111.

(3) Film 16

Figure 3:
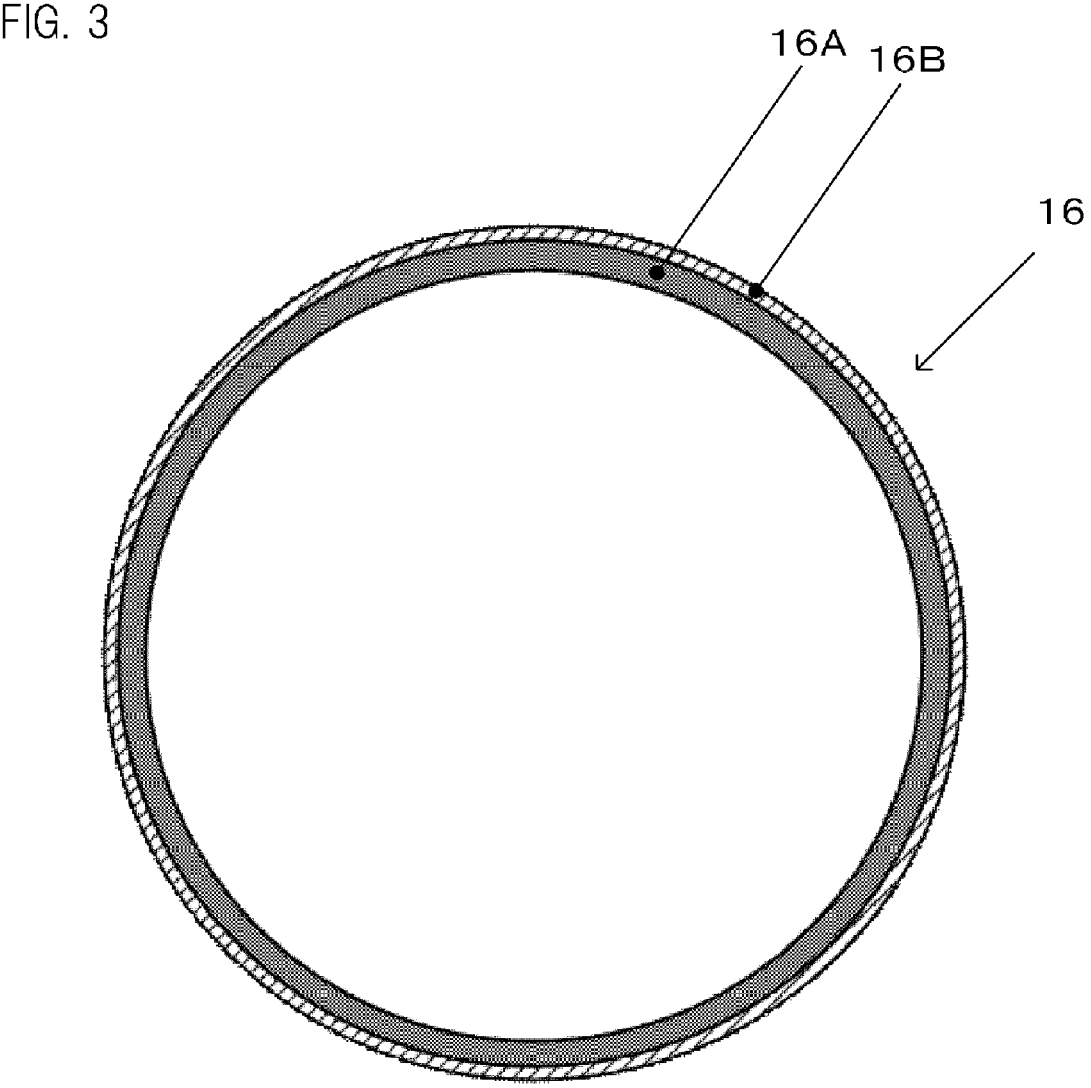
FIG. 3 is a general cross-sectional diagram of an image-forming device relating to a first embodiment of the present invention.

The film 16 is a round cylindrical shape having an outer diameter of 18 mm, and has a mold separating layer 16B made of 30 μm-thick PFA provided on top of a 120 μm-thick base layer 16A (FIG. 3). Desirably, the average value of the overall thickness of the base layer 16A is in a range of 50 to 400 μm, and more desirably, in a range of 70 to 200 μm. If the fixing film is too thin, then it tends to become difficult to achieve a uniform thickness. On the other hand, if the fixing film is too thick, then the flexibility tends to decline. The film 16 is turned at a speed of 170 mm/sec at the outer circumferential surface, while being pressed by the heater 15 at a pressure of 15 kg by the pressurizing roller 30.

The main component of the base layer 16A is a thermoplastic resin. A thermoplastic resin does not require a thermosetting step, as in the case of a thermosetting resin, and therefore when manufacturing the film 16, it is possible to employ a commonly known simple method, such as extrusion molding, injection molding, blow forming, inflation film molding, and the like. In the present embodiment, extrusion molding is used as the method of manufacturing the film 16.

Thermoplastic films can be divided broadly on the basis of the crystalline properties into two types: crystalline resin, such as PEEK, and amorphous resin, such as sulfonated polyether imide (sulfonated PEI), polyphenyl sulfone (PPSU), or the like. In the present embodiment, the material used for the base layer 16A is a blended resin which combines 70% by volume ratio of crystalline resin, and 30% by volume ratio of amorphous resin. PEEK (381G made by Victrex, Tg=143° C.) was used as a crystalline resin, and sulfonated PEI (Ultem XH6050 made by SABIC, Tg=247° C.) was used as an amorphous resin.

If there are concerns about charging up during image formation, and if improvement in the mechanical strength is required, then a filler may be added to the base layer 16A. Examples of the added filler are, for instance, carbon black, graphite powder, carbon nanotubes, metal powder, metal oxide whiskers, and the like. Of these, carbon black is especially desirable from the viewpoint of mechanical properties. Examples of carbon black may include: ketjen black, acetylene black, oil furnace black, thermal black, and channel black. It is possible to use just one of these types of carbon black, or to combine two or more of these types of carbon black. The particle size of the filler is not less than 3 nm and less than 1000 nm, and more desirably, not less than 5 nm and less than 300 nm. If the particle size of the filler is too small, then the handling during addition to the resin may become more difficult. If the particle size of the filler is too large, then it may be difficult to form a film shape. Furthermore, the ratio of the filler in the resin composition of the film is not less than 1 part by mass and no more than 40 parts by mass with respect to 100 parts by mass of the thermoplastic resin, and more desirably, not less than 3 parts by mass and no more than 20 parts by mass. If the ratio of filler is too large, then the mechanical properties may decline due to increase in the brittleness of the fixing film. If the ratio of filler is too small, then the volume resistivity of the fixing film may become too high. Moreover, the film 16 used was a film from which residual stress occurring during molding was removed by an annealing process, and furthermore a crystallization process was carried out in order to obtain the required initial strength and thermal resistance.

Next, the temperature state of the film 16 during a heating and fixing process operation of the fixing apparatus 109 will be described. Although it depends on the thickness and size of the recording medium P used, the fixing film 16 is heated to a range of approximately 80° C. to approximately 240° C. during image formation.

Figure 4:
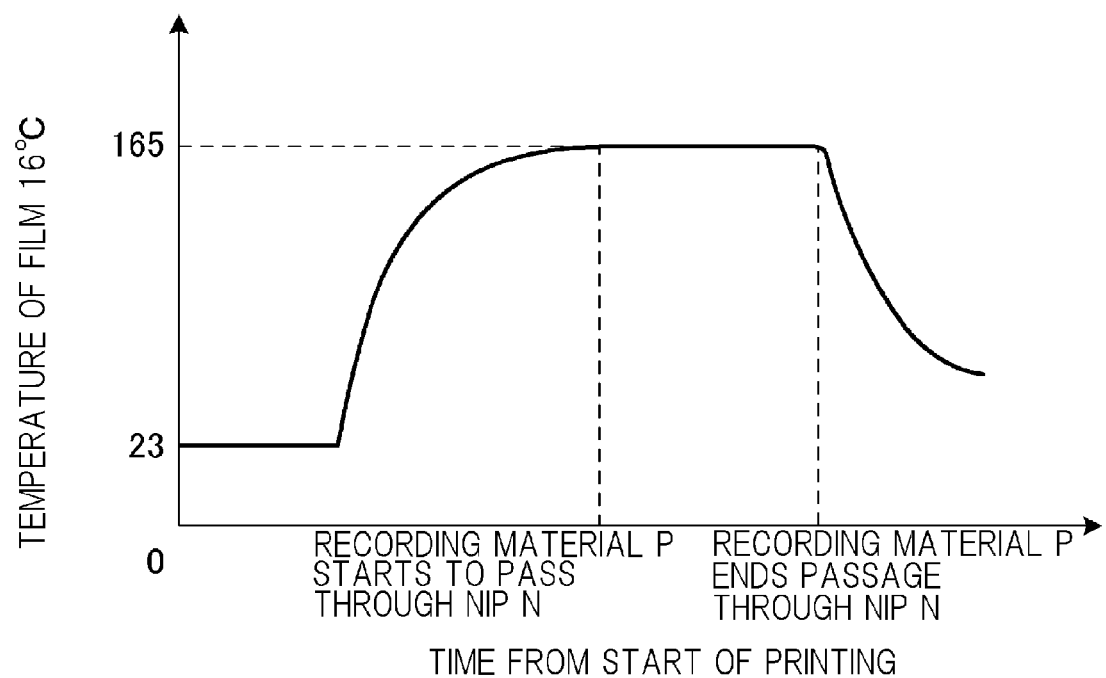
FIG. 4 is a diagram representing temporal change in the temperature of the film relating to the first embodiment of the present invention.

FIG. 4 shows the evolution of the temperature of the film 16 when using A4-size paper having a basis weight of 80 g/cm$^2$ (Red Label 80 made by Canon), as the recording medium P. The temperature of the film 16 is raised to 165° C. by the heater 15, by the time that the recording medium P arrives at the nip portion N. When the recording medium P is passing through the nip portion N, the temperature of the film 16 becomes 165° C.

(4) Fatigue Cracks and Slipping of the Fixing Film

A conventional film 16 uses only crystalline resin, or only amorphous resin, as the material of the base layer. If only crystalline resin is used as the material of the base layer of the film 16, then abrasion (wear) is liable to occur, and if only amorphous resin is used as the material of the base layer of the film 16, then fatigue cracks are liable to occur.

Firstly, fatigue cracks in a conventional film 16 will be described in concrete terms. The curvature of the film 16 varies with the position in the circumferential direction, due to receiving forces from the pressurizing roller 30 in the nip portion N. Therefore, the film 16 is bent repeatedly when the film 16 is rotated. For instance, if only a amorphous resin is used as the material for the film 16, then cracks (so-called fatigue cracks) may occur due to this repeated bending. The reason for this is that amorphous resin is generally weak against repeated bending stresses.

Figure 5:
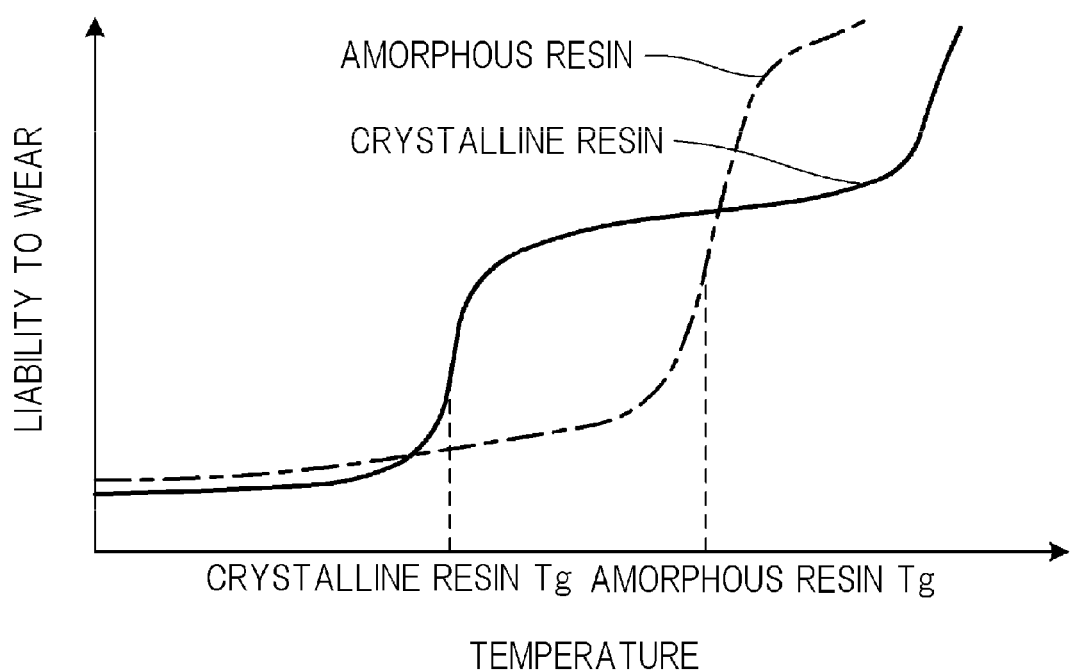
FIG. 5 is a conceptual diagram representing the liability to abrasion of crystalline resin and amorphous resin.

Next, abrasion of a conventional film 16 will be described in concrete terms. The film slides against the heater 15 at a temperature of 165° C. (processing temperature). For example, if the material of the film 16 is a single thermoplastic resin, then when the film 16 exceeds the glass transition temperature Tg of the thermoplastic resin, then the abrasion of the film becomes dramatically worse (FIG. 5). This is because the movement of the molecules in the amorphous portion is activated when the temperature goes above the glass transition temperature Tg, and the resin suddenly becomes soft. If there is large abrasion of the film in this way, then the frictional resistance between the film 16 and the heater 15 becomes larger due to the viscosity of the abrasive powder, and slipping may occur which prevents the film 16 from rotating in accordance with the roller. If slipping occurs, non-uniformities arise in the transmission of the heat to the recording medium P, and non-uniformities arise in the luster of the image. Crystalline resin has stronger resistance to fatigue cracks than amorphous resin, but usually has a lower glass transition temperature Tg than amorphous resin. In other words, with a conventional film 16, it is difficult to address both abrasion and fatigue cracks at the same time.

(5) Suppression of Fatigue Cracks and Slipping in Film 16

Firstly, a fatigue crack suppressing effect of the present embodiment will be described. The relationship between the blending ratio of a 120 μm-thick film formed by extrusion molding of a blended resin of PEEK and sulfonated PEI and the bending strength thereof at 165° C. is shown in FIG. 6. The bending strength was measured in compliance with JIS-P8115 (2001), except for the fact that testing was carried out while heating the film to 165° C. with a hot air current. From the measurement results, it can be seen that the bending strength varies greatly when the volume ratio of the PEEK is in a range of 30% to 70%, and does not change significantly outside of this range. In other words, when the volume ratio of PEEK is not less than 70%, then the bending strength can be increased to substantially the same level as when the volume ratio of PEEK is 100%.

Figure 7A:
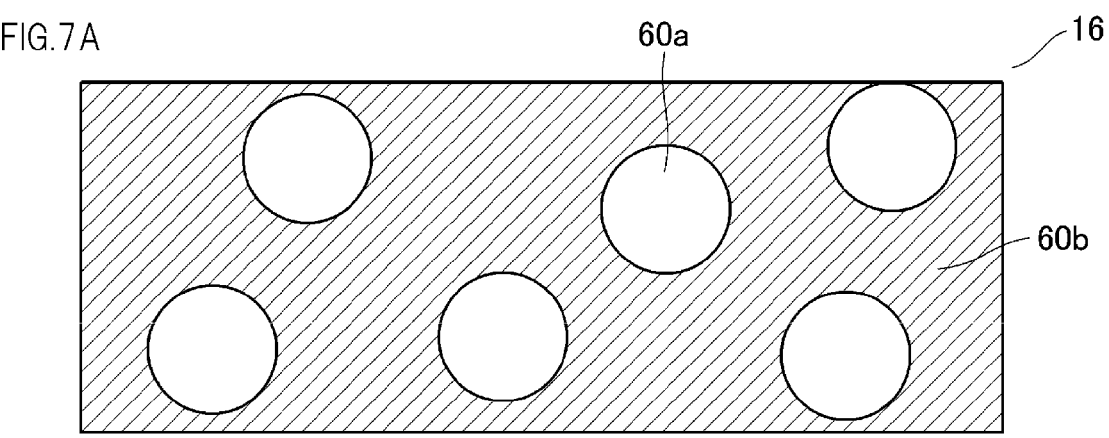
FIGS. 7A to 7C are schematic drawings representing a dispersed state of a base layer of a film.
Figure 7B:
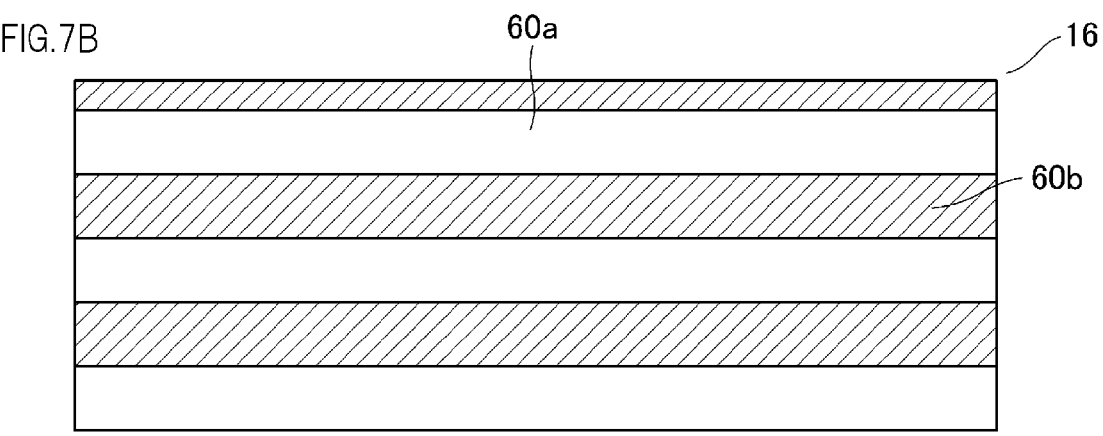
Figure 7C:
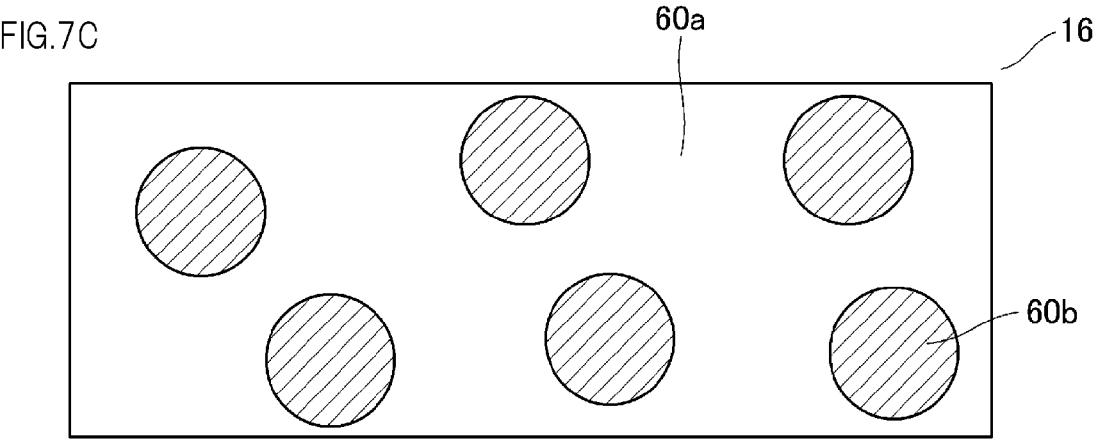

Furthermore, when a 120 μm-thick film formed by extrusion molding of a blended resin of PEEK and sulfonated PEI was observed with a TEM, it could be seen that the dispersed state of the PEEK phase 60a and the sulfonated PEI phase 60b changes with the volume ratio of the PEEK, as shown in FIGS. 7A to 7C. FIG. 7A is a schematic diagram of a phase composition when the volume ratio of the PEEK is less than or equal to 30%, FIG. 7B is a schematic diagram of a phase composition where the volume ratio of PEEK is greater than 30% and less than 70%, and FIG. 7C is a schematic diagram of a phase composition when the PEEK volume ratio is equal to or greater than 70%.

Here, the reason why the bending strength can be improved by setting the volume ratio of the PEEK to be not less than 70%, and adopting the phase composition shown in FIG. 7C, was inferred by the present inventors to be that indicated below. Sulfonated PEI, which is an amorphous resin, is weak against repeated bending stresses, and therefore the sulfonated PEI phase 60b is liable to form starting points of cracks. If the sulfonated PEI phase 60b is disposed or isolated in island shapes, then even if cracks occur in the sulfonated PEI, the advance of the cracks is restricted by the PEEK phase 60a, and therefore this does not lead directly to fatigue cracks. On the other hand, if the sulfonated PEI phase 60b is joined in a continuous fashion, then a crack will advance progressively in the sulfonated PEI phase 60b only, without passing via a PEEK phase 60a, and therefore the fatigue cracks become worse.

Next, the abrasion suppressing effects of a film 16 relating to the present embodiment will be described. The relationship between the blending ratio of a 120 μm-thick film formed by extrusion molding of a blended resin of PEEK and sulfonated PEI and the amount of abrasion thereof at 165° C. is shown in FIG. 8. The amount of abrasion is taken to be the amount of weight change in the film 16 when the roller 105 was rotated for 120 hours while heating the heater 15 so as to achieve a temperature of 165° C. of the film 16, in a composition where the blend ratio of the film 16 of the fixing unit 109 of the present embodiment was varied. From the measurement results, it can be seen that the amount of abrasion varies greatly when the volume ratio of the PEEK is in a range of 100% to 90%, and does not change significantly outside of this range. In particular, the amount of abrasion changes greatly when the volume ratio of the PEEK is in a range of 100% to 99%. In other words, even if a small amount of sulfonated PEI is blended with the PEEK, the abrasion resistance can be improved. The reason for this was inferred by the present inventors to be that described below.

Figure 9:
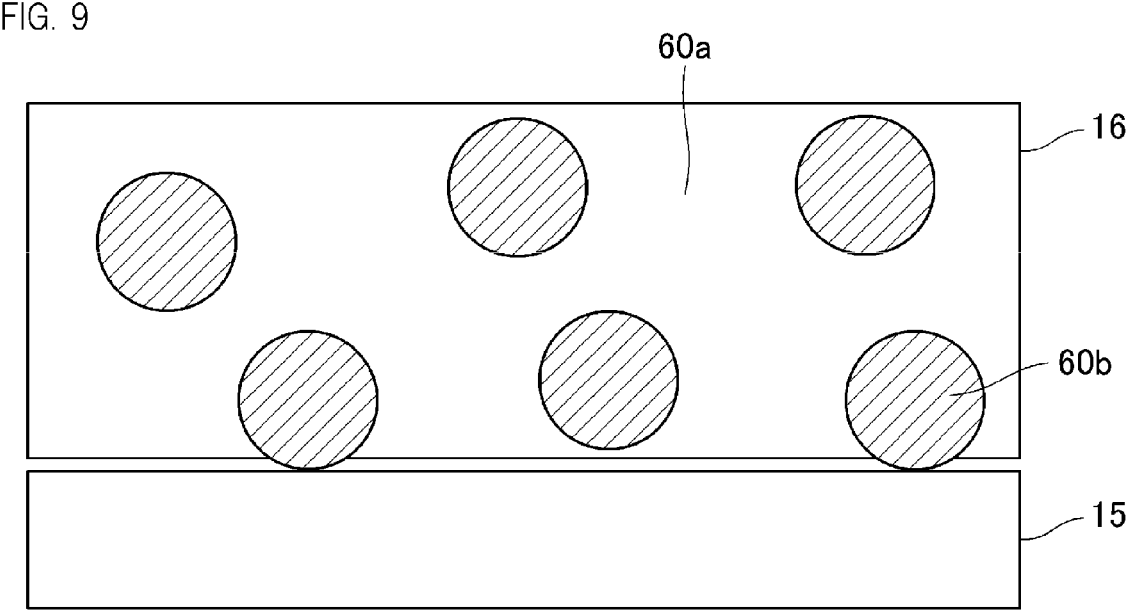
FIG. 9 is a schematic drawings representing an estimation mechanism for suppressing abrasion of the film relating to the first embodiment.

The blending materials of the polymer blend according to the present embodiment were selected to be PEEK which has a glass transition temperature Tg (143° C.) which is lower than the temperature of 165° C. used in the heat treatment of the film 16, and sulfonated PEI which has a glass transition temperature Tg (247° C.) that is higher than said temperature. Therefore, at the use temperature 165° C. of the film 16, the PEEK phase 60a is soft and the sulfonated PEI phase 60b is hard. Therefore, the PEEK phase 60a of the film 16 wears preferentially during use, and as shown in FIG. 9, the sulfonated PEI phase 60b assumes a surface state of projecting beyond the surface of the PEEK phase 60a. Therefore, the hard sulfonated PEI phase 60b receives the majority of the force from the heater 15. Thereafter, the soft PEEK phase 60a is not liable to receive force from the heater 15, and therefore the abrasion of the PEEK phase 60a becomes less liable to advance.

From the foregoing, in the present embodiment, the blending volume ratio (A/B) of the crystalline resin (A) and the amorphous resin (B) in the blended resin used in the base layer 16A of the film 16 is between 70/30 and 99/1. The effects of the present embodiment in suppressing fatigue cracks and suppressing slipping were confirmed in actual practice. More specifically, the fatigue cracks after passing 50,000 sheets and the slipping after passing 50,000 sheets in the composition of the present embodiment were evaluated. The paper sheets passed where Red Label 80. As a first comparative example, compositions were prepared in which the volume ratio (%) of the thermoplastic resins in the material of the base layer 16A of the first embodiment was changed to PEEK/sulfonated PEI=100/0, 50/50, 0/100. Table 1 shows the evaluation results. As shown in Table 1, it can be seen that the first embodiment is able to suppress both fatigue cracks and slipping.

TABLE 1

| | Volume ratio (%) | | | |
| --- | --- | --- | --- | --- |
| | PEEK | Sulfonated PEI | Fatigue cracks | Slipping |
| Embodiment 1 | 70 | 30 | ◯ | ◯ |
| Comparative | 100 | 0 | ◯ | x |

TABLE 1-continued

| | Volume ratio (%) | | | |
|---|---|---|---|---|
| | PEEK | Sulfonated PEI | Fatigue cracks | Slipping |
| Example 1 | 50 | 50 | x | o |
| | 0 | 100 | x | o |

Second Embodiment

The film relating to a second embodiment of the present invention is now described. Here, principally, only the points which are different to the first embodiment are explained, and the composition which is similar to the first embodiment is labelled with the same reference numerals and is not described further here. Matters which are not described here are similar to the first embodiment.

In the present embodiment, the same composition as the first embodiment was adopted entirely, apart from the fact that polyether ketone ether ketone ketone (PEKEKK) was used as a crystalline resin, and PPSU was used as an amorphous resin. More specifically, in the present embodiment, the material used for the base layer 16A is a blended resin which combines 70% by volume ratio of crystalline resin, and 30% by volume ratio of amorphous resin. PEKEKK (HT made by Victrex, Tg=162° C.) was used for the crystalline resin, and PPSU (Radel R R-5000 made by Solvay Advanced Polymers (today's Solvay Specialty Polymers), Tg=220° C.) was used for the amorphous resin.

The effects of the present embodiment in suppressing fatigue cracks and suppressing slipping were confirmed in actual practice. The method of evaluation was the same as that employed in the first embodiment. As a second comparative example, compositions were prepared in which the volume ratio (%) of the thermoplastic resins in the material of the base layer 16A was changed to PEKEKK/PPSU=100/0, 50/50, 0/100. Table 2 shows the evaluation results.

TABLE 2

| | Volume ratio (%) | | | |
|---|---|---|---|---|
| | PEKEKK | PPSU | Fatigue cracks | Slipping |
| Embodiment 2 | 70 | 30 | o | o |
| Comparative Example 2 | 100 | 0 | o | x |
| | 50 | 50 | x | o |
| | 0 | 100 | x | o |

It can be seen that in the second embodiment, it is possible to suppress both fatigue cracks and slipping. In other words, even with a blended resin containing PEKEKK and PPSU, by making the volume ratio of the crystalline resin not less than 70%, it is possible to suppress both fatigue cracks and slipping.

As described in the present embodiment, the combination of the crystalline resin and the amorphous resin in the material of the base layer 16A is not limited to PEKEKK and PPSU, provided that a combination is adopted in which the Tg of the amorphous resin is higher than the crystalline resin.

Furthermore, since the base layer 16A may deteriorate when toner components, and the like, become attached thereto, then a crystalline polyaryl ether ketone resin having excellent chemical resistance is suitable as the crystalline resin. The crystalline polyaryl ether ketone resin is a crystalline resin including a homopolymer, copolymer, terpolymer, grafted copolymer, or the like, which contains a monomer unit including one or more aryl groups, one or more ether groups and one or more ketone groups. For example, this resin can be selected from among: PEEK, PEKEKK, polyether ketone (PEK), polyether ketone ketone (PEKK), polyaryl ether ketone ether ketone ketone (PAEKEKK), polyaryl ether ketone (PAEK), polyaryl ether ether ketone (PAEEK), polyether ether ketone ketone (PEEKK), polyaryl ether ketone ketone (PAEKK), polyaryl ether ether ketone ketone (PAEEKK), and the like. If the melting point is low, then the resin melting temperature when manufacturing the base layer 16a can be lowered, and it is especially desirable to use PEEK as the crystalline resin, since this facilitates manufacture. Furthermore, when using a crystalline polyaryl ether ketone resin, the amorphous resin is desirably a resin having a glass transition temperature Tg which is sufficiently higher than the glass transition temperature Tg of the crystalline polyaryl ether ketone resin. Examples of resins of this kind are, for instance, sulfonated PEI, PPSU, PESU, polysulfone (PSU), and the like. Of these, sulfonated PEI has a particularly high glass transition temperature Tg, and therefore if used as the material of the base layer 16A, has a merit in permitting reduction of the restrictions on the through-put of recording media P having a narrow width. The reason for this is described below.

When recording medium P of narrow width is passed, the temperature of the portion of the film 16 in the lengthwise direction where paper is not passed becomes higher than the temperature of the portion where passed is passed. In this case, the through-put of the recording medium P must be slowed, in order that the temperature of the portion of the film 16 where paper is not passed does not exceed the glass transition temperature Tg of the amorphous resin. This is because if the temperature of the portion of the film 16 where the paper is not passed exceeds the glass transition temperature Tg of the amorphous resin, then the rigidity of the film 16 declines suddenly and this may lead to breakdown of the film. Therefore, by using sulfonated PEI which has a high glass transition temperature Tg for the amorphous resin, it is possible to reduce restrictions on the through-put of the recording medium P.

Furthermore, it is also possible to use a plurality of crystalline resins and to use a plurality of amorphous resins as the material of the base layer 16A. Moreover, for instance, it is also possible to use a combination of any one of, or a plurality of, PEEK, PEK and PEKEKK, as a crystalline resin, and any one of, or a plurality of, sulfonated PEI, PPSU and PESU, as an amorphous resin.

Figure 10:
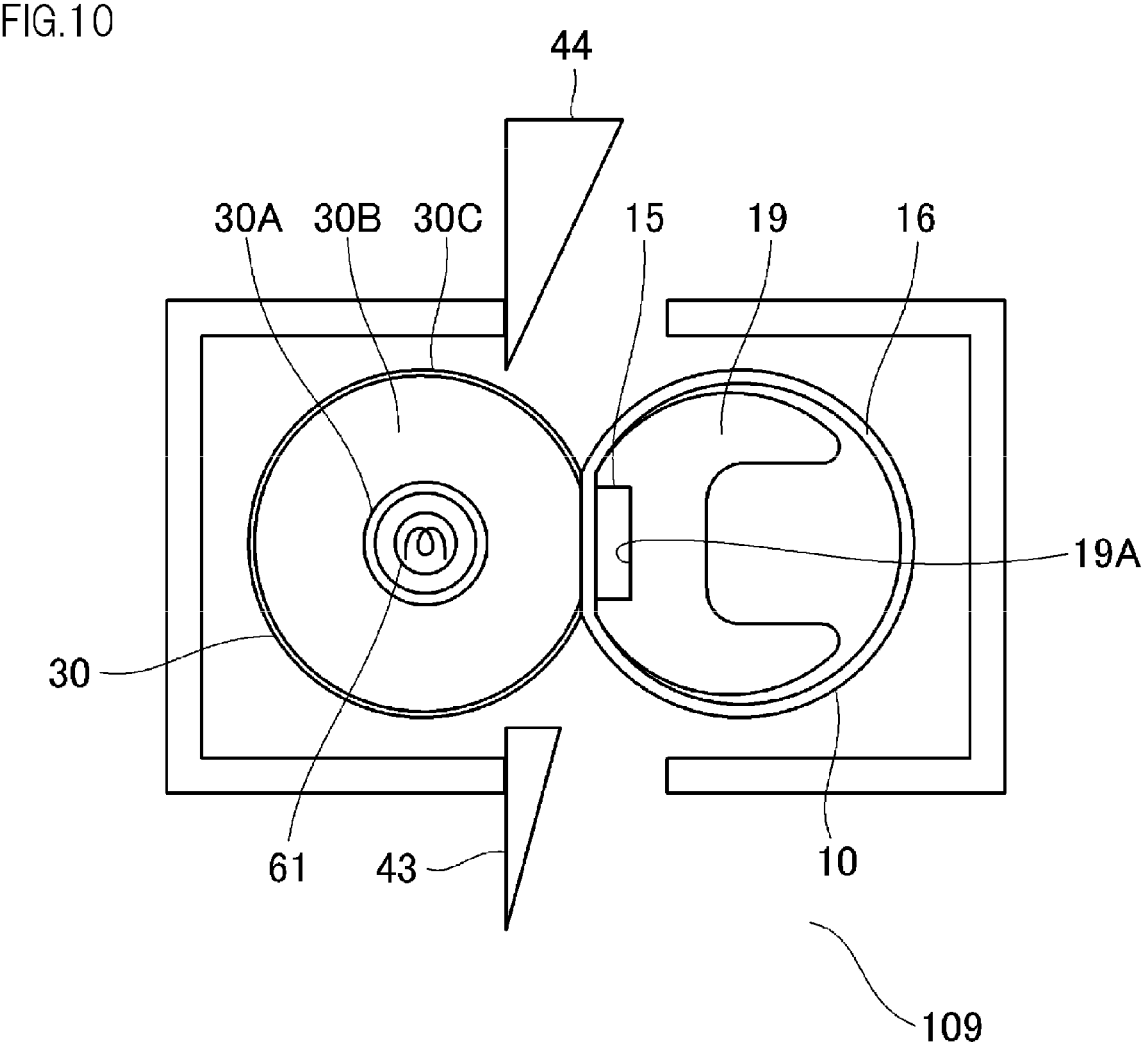
FIG. 10 is a schematic cross-sectional diagram showing a further configuration of a fixing apparatus relating to an embodiment of the present invention.
Figure 11:
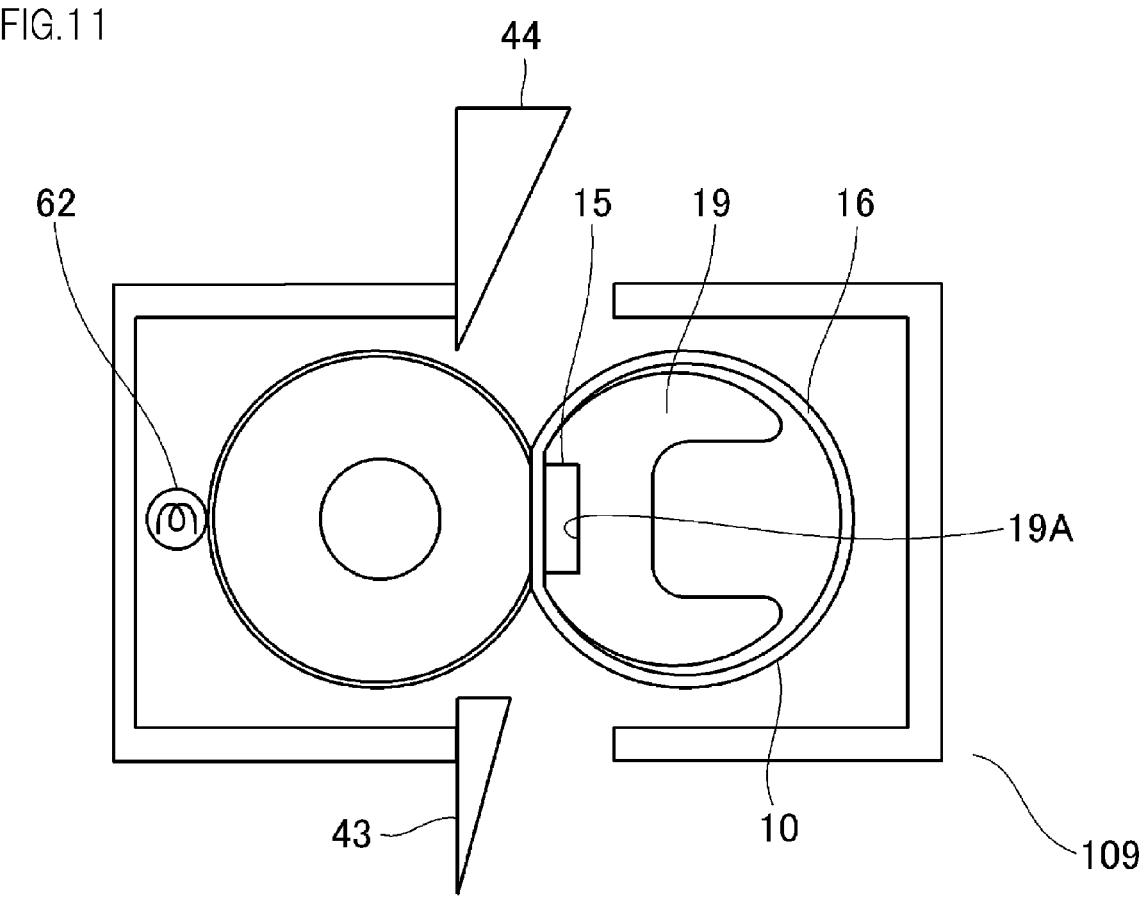
FIG. 11 is a schematic cross-sectional diagram showing a further configuration of a fixing apparatus relating to an embodiment of the present invention.

Furthermore, the film 16 according to the first embodiment and the second embodiment was used in a composition having a heat source on the inner side of the film 16, but the present embodiment is not limited to this composition. Any composition may be adopted, provided that the film 16 undergoes repeated bending at or above the Tg temperature of the crystalline resin, and that the film 16 slides over the nip portion forming member 15 at or above the Tg temperature of the crystalline resin. For instance, as shown in FIG. 10, it is possible to adopt a composition in which a heat source 61 (halogen heater) is incorporated inside the metal core 60A. Furthermore, for example, it is also possible to adopt a composition including a heat source 62 which heats the outer circumferential surface of the pressurizing roller 30, as shown in FIG. 11. Moreover, a fixing apparatus having a halogen heater incorporated inside the film 16 may be used.

In each of the embodiments described above, an example is given in which the invention is applied to a heat fixing apparatus which fixes an image to a recording medium by applying heat, but the range of application of the present invention is not limited to this. For example, the present invention may be applied widely to apparatuses for providing a heat treatment on a medium receiving application of heat, such as an image heating device for modifying the surface of a recording medium, so as to create a luster on the surface of the recording medium by heating, an image heating device for provisional fixing, a heating and drying apparatus for a medium receiving application of heat, a heating laminate apparatus, and the like.

(4) Differences Between Comparative Examples and Embodiments

In the method for manufacturing a fixing film, the fixing films according to embodiment 3-1, embodiment 3-2 and comparative examples 3 to 5 were manufactured by the same method, except for the fact that the composition of the blended resin used in the base layer 16A was changed to the compositions indicated in Table 3.

Table 3 shows the results of confirming the performance of comparative examples 3 to 5 and embodiments 3-1 and 3-2.

TABLE 3

| | Resin parts by mass (100) | | | Added filler w.r.t. 100 parts by mass of resin | Performance evaluation | | | |
|---|---|---|---|---|---|---|---|---|
| | PEEK | PEI | Sulfonated PEI | | Tensile elasticity GPa 160° C. | Thermal resistance | Bending resistance (new) | Bending resistance (after durability testing) |
| Comparative example 3 | 100 | 0 | 0 | 0 | 0.76 | NG | OK | OK |
| Comparative example 4 | 0 | 0 | 100 | 0 | 1.41 | OK | NG | NG |
| Comparative example 5 | 70 | 30 | 0 | 0 | 1.08 | OK | OK | NG |
| Embodiment 3-1 | 70 | 0 | 30 | 0 | 1.04 | OK | OK | OK |
| Embodiment 3-2 | 70 | 0 | 30 | 10 | 1.20 | OK | OK | OK |

In the present embodiment, there are no particular restrictions on the method for confirming the volume ratio of the blended resin. For example, it is possible to use a commonly known method in which an ultra-thin cut piece is created by cutting the base layer 16A in a prescribed direction, is dyed with ruthenium tetroxide (RuO4), or the like, and is observed with an transmission electron microscope (TEM), or the like. In the case of this method, for example, the surface area ratio of each resin phase in the material of the base layer 16A, in a cross-section of the base layer 16A, is the volume ratio.

Third Embodiment

The image-forming apparatus and the fixing apparatus according to the present embodiment is the same as the first embodiment, with the exception of the film 16, and therefore description thereof is omitted here. Furthermore, since the basic composition of the film 16 is the same as the first embodiment, description thereof is omitted here. The point of difference with the film of the first embodiment is described in detail here. As stated in the first embodiment, the fixing film 16 is heated to a range of approximately 80° C. to approximately 240° C. during the fixing process. Furthermore, as described above, the fixing film 16 makes contact in a state of being pressurized by the outer circumferential surface of the pressurizing roller 30, and therefore rotates in a twisted and deformed state within the range of elastic deformation. For the reasons given above, it is important that the fixing film 16 should maintain thermal resistance in a broad range, and bending resistance within the range of elastic deformation, during the product lifespan.

The object of the present embodiment is to provide a fixing film having higher bending resistance, which is a round cylindrical fixing film created by extrusion molding using a blended resin of PEEK and PEI that demonstrate good compatibility.

Comparative example 3 is a fixing film made from PEEK only. This fixing film has a low thermal resistance, and has a possibility of breaking or deforming during image formation. This is because the glass transition temperature (Tg) of the PEEK (Victrex 381G) is 143° C., which is lower than the use temperature range. The glass transition temperature of the sulfonated PEI (Sabic Ultem XH 6050) shown in comparative example 4 is a high value of 247° C., but since this resin is an amorphous resin and has poor bending resistance, then there is a possibility of fracturing of the fixing film, and so on.

Comparative example 5 is a blended resin of PEEK (Victrex 381G) and PEI (Ultem #1000) which have good compatibility. The fixing film made from blended resin disclosed in comparative example 5 does not present any problems in terms of thermal resistance and bending resistance when new, but upon confirming the durability using an image-forming apparatus, a decline in the bending resistance after durability testing was observed.

On the other hand, in embodiment 3-1, there was no deterioration in the thermal resistance or the bending resistance throughout the lifespan of the image-forming apparatus, and no problematic defect was observed. In embodiment 3-2, ten parts of a conductive filler was added to 100 parts by mass of the blended resin in embodiment 3-1, and by setting an appropriate amount of filler, the bending resistance did not present any problems, both initially and after durability testing, and good performance could be obtained.

The difference between comparative example 3 and embodiments 3-1 and 3-2 can be regarded as due to the fatigue of the film bending resistance. This is now described by using the results of MIT testing according to JIS P 8115 (bending resistance test method).

With regard to the test conditions, the radius of curvature of the bending surface of a bending clamp was 0.38 mm, the width of the test piece was 10±0.1, the load was 9.8 N, and the bending angle was 135±2°. The number of bending operations until the test piece broke was taken to be the bending resistance number.

Figure 12:
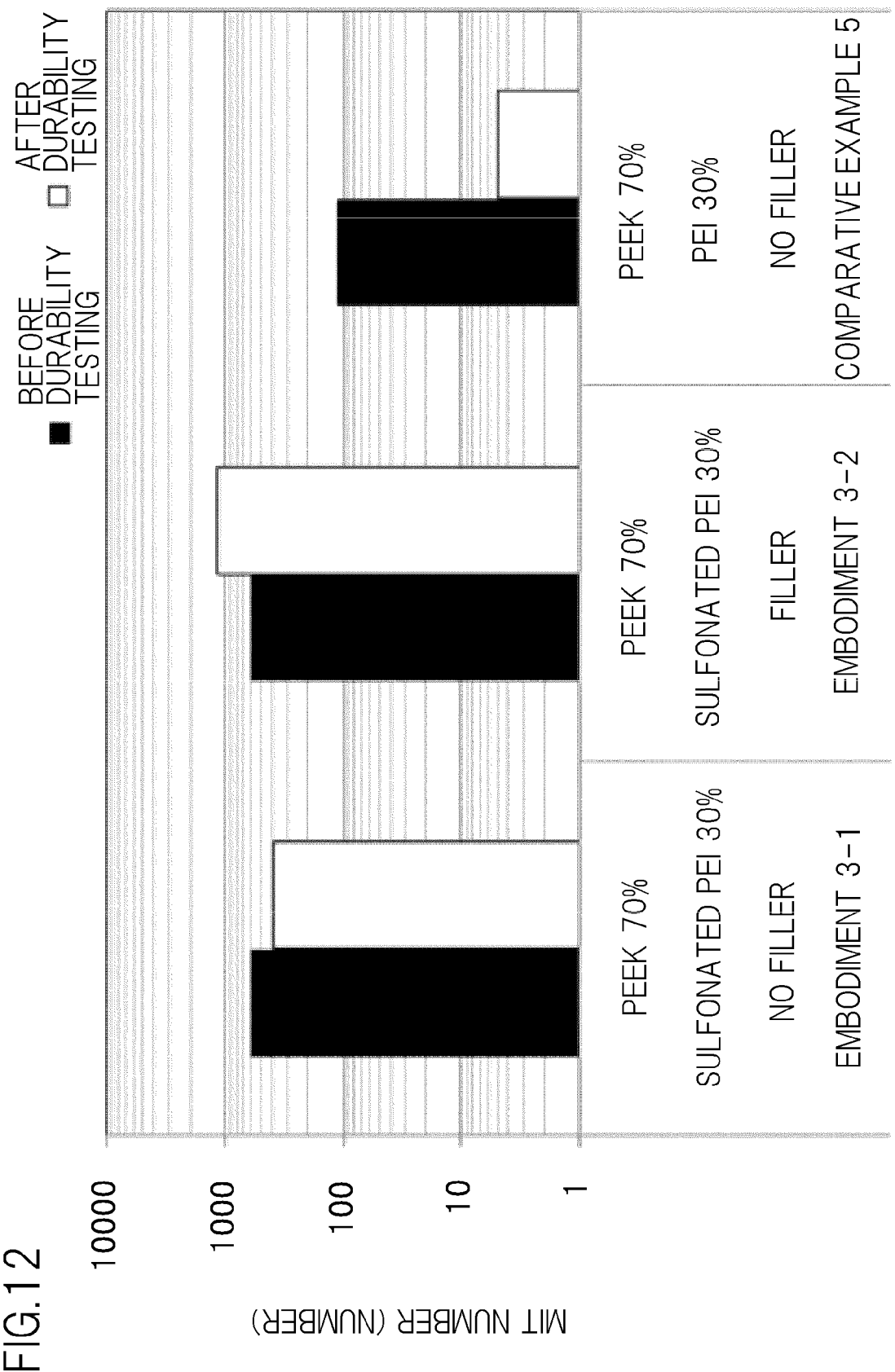
FIG. 12 shows the results of a MIT test for a fixing film relating to a sixth embodiment.

FIG. 12 shows the MIT test results when new, and the MIT test results after durability testing using an image-forming apparatus, for comparative example 5, embodiment 3-1 and embodiment 3-2. In the case of the combination of materials in comparative example 3, the MIT number declined markedly after durability testing. On the other hand, it can be seen that the fixing film having the materials in embodiments 3-1 and 3-2 showed little decline in the MIT before and after durability testing, and hence the bending resistance was stable throughout the product life.

The difference in durability between comparative example 5 and embodiments 3-1 and 3-2 is considered by the present inventors to be due to the state of mixing of the blended resin. The inferred mechanism for this is described below.

When forming a fixing film with a material made from a blended resin, it is considered that the state of mixing between the resins forming the blended resin is important. If the resins are not mixed with each other, then it is attempted to form a thin film, the film forming properties decline and it is difficult to form the film shape, and there may be cases where the film shape can be formed, and the film does not have the mechanical strength required for practical use. On the other hand, in the case of a blended resin which is completely mixed as in comparative example 5, these resins are mixed together at the molecular level, and a film can be formed without any problem.

However, when a completely mixed blended resin is used as a fixing film in an image-forming apparatus, it surmised that the bending resistance deteriorates during the growth process of crystallization. If the PEEK is exposed to high temperatures, the crystallization is promoted, but the progress of crystallization of the PEEK inside the blended resin which is completely mixed at the molecular level is considered to be crystallization progressing in a state where the PEI which has good compatibility is wrapped inside the crystal nuclei of the PEEK. In other words, it is considered that the bending resistance declines in the comparative example, because of the growth of crystal nuclei in which the PEI, which has inferior bending resistance to the PEEK, is incorporated inside the crystal nuclei of the PEEK. On the other hand, in the present embodiment, the PEEK and the sulfonated PEI form a smooth mixed state. Since the grain interfaces which form the unmixed portion are present in sufficiently small units compared to the thickness of the film, then the film formation properties are good and a film having sufficient mechanical strength is obtained. The present inventors considered that there is no decline in the bending resistance when a blended resin having a gradual mixed state of this kind is used as a fixing film in an image-forming apparatus, due to the fact that the crystallization of the PEEK occurs without the sulfonated PEI becoming incorporated inside the crystal nuclei of the PEEK.

(5) Results of Differential Scanning Calorimetric Measurement (DSC) in Comparative Example 5 and Embodiment 3

Differential scanning calorimetric measurement (DSC) is used here to explain the differences between comparative example 5 and embodiment 3, as indicated below. Firstly, the method of measuring the glass transition temperature (Tg) in the present embodiment will be described.

5 to 20 mg, and desirably, 10 mg, of a measurement sample was weighed out precisely. This sample was introduced into an aluminum pan, and using the empty aluminum pan as a reference, was measured in a measured temperature range of 80° C. to 380° C., at a ramp rate of 10° C./min. The apparatus used for measurement was a Mettler Toledo DSC 823.

A: PEEK 100 parts by mass

B: PEEK 70 parts by mass/PEI 30 parts by mass (comparative example 5)

C: PEEK 70 parts by mass/sulfonated PEI 30 parts by mass (embodiment 3-1)

Figure 13:
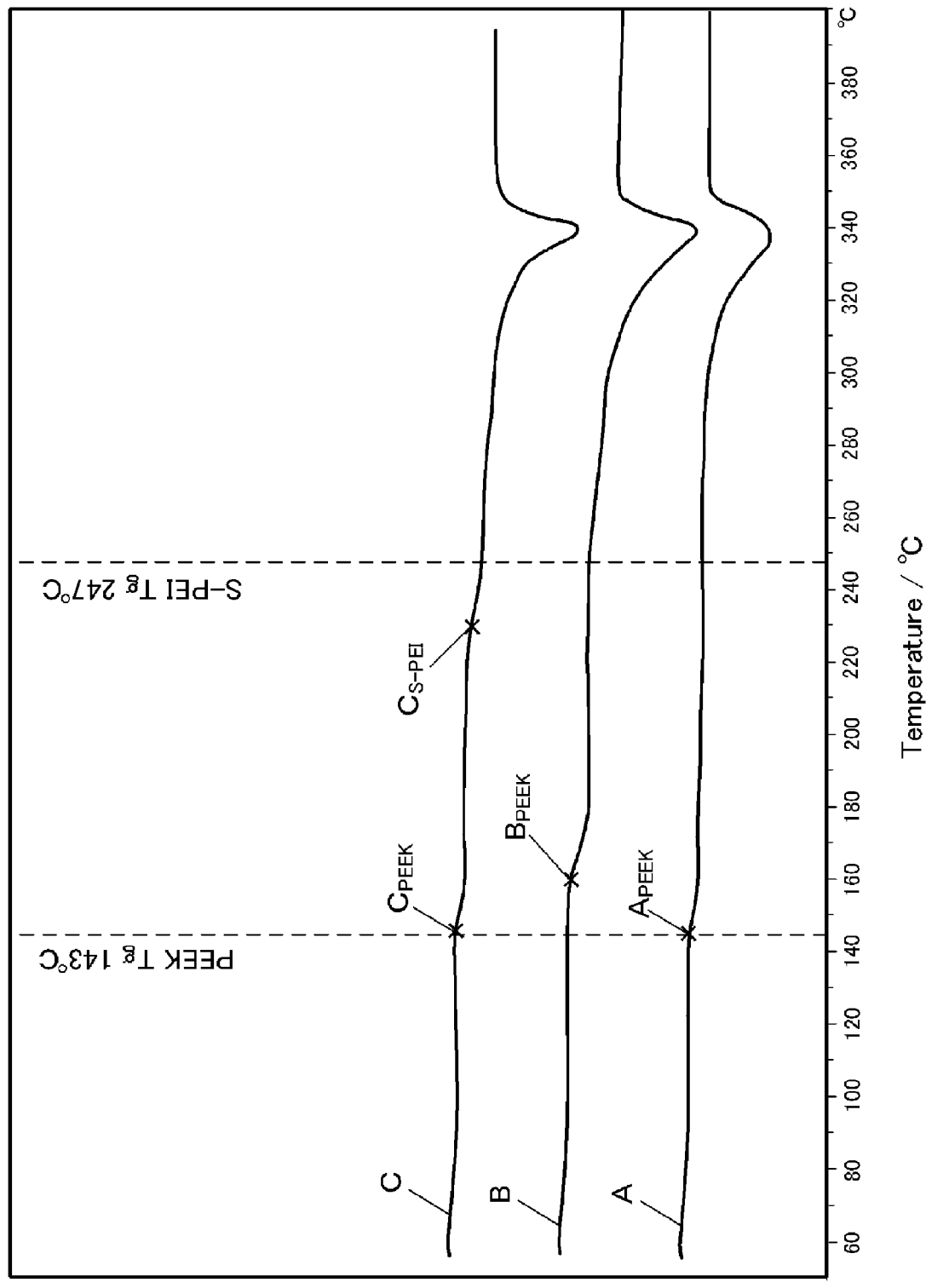
FIG. 13 shows the results of DSC for a fixing film relating to the sixth embodiment.

As shown in FIG. 13B, in comparative example 5, one glass transition temperature was observed ($B_{PEEK}$), at 159° C., despite the fact that the resin was a blended resin of two types: PEEK (Tg 143° C.) and PEI (Tg 217° C.). In other words, the glass transition temperature of the PEEK in comparative example 5 showed a higher result than the glass transition temperature for 100 parts by mass of PEEK (pure PEEK) ($A_{PEEK}$=143° C.).

It is generally known that the glass transition temperature in a case where resins having different glass transition temperatures, Tg1 and Tg2, are blended and completely mixed together is given by the FOX equation which is shown in Expression (1). In comparative example 5, the observed glass transition temperature (159° C.) is substantially consistent with the glass transition temperature (159.4° C.) obtained from the FOX equation, and therefore the blended resin in comparative example 5 is considered to have the PEEK and the PEI in a completely mixed state.

$$\frac{1}{T_g} = \frac{w_1}{T_{g,1}} + \frac{w_2}{T_{g,2}}. \quad \text{[Expression 1]}$$

($W_1$ and $W_2$ are the respective weight ratios of the resins) Formula (1)

On the other hand, in the case of embodiment 3-1 shown in FIG. 13C, there are two observed glass transition temperatures, which are caused by the PEEK ($C_{PEEK}$) and the sulfonated PEI ($C_s^-{}_{PIE}$). The glass transition temperature due to the PEEK ($C_{PEEK}$) observed in embodiment 3-1 is 145° C., and the glass transition temperature ($A_{PEEK}$) of the 100 parts by mass of the PEEK (pure PEEK) is virtually the same. On the other hand, it was confirmed that the glass transition temperature ($C_s^-{}_{PEI}$) due to the sulfonated PEI is in the vicinity of 230° C., which is shifted to the lower temperature side from the glass transition temperature of pure sulfonated PEI, which is 247° C. The present inventors considered that this is because the sulfonated PEI and the PEEK form a gradual mixed state, rather than a completely unmixed state.

It is considered that, by setting two or more glass transition temperatures for the blended resin as described above, a gradual mixed state is formed. Therefore, the blended resin used in the present embodiment has two or more glass transition temperatures measured in the differential scanning calorimetric measurement. Furthermore, desirably, the glass transition temperature due to the amorphous resin which is measured by the differential scanning calorimetric measurement of the blended resin is lower than the glass transition temperature of the amorphous resin measured by the differential scanning calorimetric measurement.

Furthermore, from the results of the tensile elasticity measurement in a film state, it can be seen that the materials of the present embodiment form a gradual mixed state, rather than a completely unmixed state. Table 1 shows the results of measuring the tensile elasticity using a 100 μm-thick film in a 160° C. environment.

In the present invention, the tensile elasticity of the 100 µm-thick film in the 160° C. environment was measured by a method compliant with JIS 7127.

In comparative example 1, which is pure PEEK, decline in the elasticity is observed when the glass transition temperature is exceeded, and the tensile elasticity in a 160° C. environment was 0.76 GPa. The sulfonated PEI in comparative example 4 was at or below the glass transition temperature in the 160° C. environment, and had a high elasticity of 1.41 GPa. Comparative example 5, which is a blended resin having high compatibility, had an elasticity of 1.08 GPa, the elasticity being raised due to the addition of PEI. This is thought to be because a reinforcing effect due to the addition of PEI is obtained in the film state, due to the high compatibility between the resins in comparative example 3 and the excellent film forming properties. On the other hand, in embodiment 3-1, the tensile elasticity was 1.04 GPa, and the elasticity was improved by the addition of sulfonated PEI. Furthermore, in the embodiment 3-2, a further improvement in the elasticity was observed due to the addition of a filler. For this reason also, the embodiments 3-1 and 3-2 have excellent film forming properties and are considered to show a gradual mixed state. This same tendency was observed in a film thickness range of 50 to 150 µm. As described above, in the present invention, under the environment at the temperature of 160° C., the tensile elasticity of a 100 µm-thick film-shaped sample is desirably higher in the case of a blended resin, than in the case of a crystalline polyaryl ketone resin.

The present inventors made the following observations with regard to the mechanism by which the blended resin of sulfonated PEI and PEEK shown in embodiment 3-1 forms a smooth mixed state without being completely mixed.

As shown by Structural Formula (1) below, the structure of sulfonated PEI includes a sulfonyl group having a large polarity in the main chain of the PEI. The PEEK and PEI essentially have very high compatibility, but due to the presence of sulfonyl groups containing sulfur which are highly polarized, the electrostatic forces due to polarization affect the interactions between molecules, and the compatibility with PEEK partially becomes incompatible. In this way, desirably, the amorphous resin used in the blended resin relating to the present invention is a resin having a group of large polarity, such as a sulfonyl group, in the main chain.

The amorphous resin used in the present embodiment is a resin which is formed from any one, or at least two of: sulfonated polyether imide (PEI), polyether sulfone (PES), polyphenyl sulfone (PPSU), and polysulfone (PSf).

As described above, by achieving a gradual mixed state between the crystalline polyaryl ketone resin and the amorphous resin, good film forming properties are guaranteed, and it is possible to provide a fixing film in which there is no deterioration of bending resistance due to the advance of crystallization as a result of use under high-temperature conditions.

Fourth Embodiment

The method for manufacturing a fixing film according to the present embodiment differs from the third embodiment only in respect of the material of the fixing film used, and is the same as the third embodiment in all other respects, and therefore only the differences are described here.

(6) Differences Between Comparative Examples and Embodiments

In the present embodiment also, the fixing film 16 forms a two-layer structure. In embodiment 4-1 (see Table 4), the base layer 16A is a blended resin (90 µm thick) of PEEK (Victrex 381G, Tg 143° C.) which is a crystalline polyaryl ketone resin, and PPSU (Solvay Specialty Polymers Radel R R-5000, Tg 220° C.) which is an amorphous resin, and the surface layer 16B is made of PFA tube (DuPont 450 HP) (30 µm thick).

In embodiment 4-2, the base layer 16A is a blended resin (90 µm thick) of PEEK (Victrex 381G, Tg 143° C.) which is a crystalline polyaryl ketone resin, and PES (Solvay Specialty Polymers Radel Polyether sulfone, Tg 220° C.) which is an amorphous resin, and the surface layer 16B is made of PFA tube (DuPont 450 HP) (30 µm thick).

In both of embodiments 4-1 and 4-2, the average value of the overall thickness of the fixing film 16 was 120 µm.

The results of a performance comparison carried out with the fixing film 16 of the present embodiment and the film 16 of comparative example 5, using the image-forming apparatus described above, are shown in Table 4. Embodiment 4-1 showed little deterioration in either the thermal resistance or the bending resistance throughout the lifespan of the image-forming apparatus. In embodiment 4-1, similarly, although PPSU was used as the amorphous resin, there was little deterioration during durability testing. Furthermore, the tensile elasticity in a 100 µm-thick film state was also similar to that of comparative example 5 in which the resins are completely mixed (see Table 4).

Furthermore, the Tg of the blended resin in the fixing film in embodiment 4-1 was 150° C. and 210° C. (due to the amorphous resin), and the Tg of the blended resin in the fixing film in embodiment 4-2 was 152° C. and 208° C. (due to the amorphous resin).

[Chemical Formula 1]

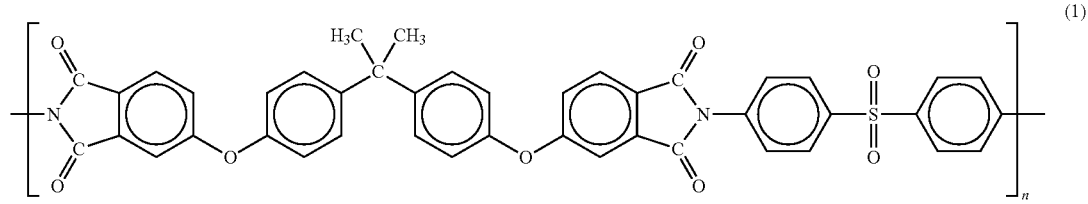

(1)

TABLE 4

| | Resin parts by mass (100) | | | | Performance evaluation | | | |
|---|---|---|---|---|---|---|---|---|
| | | | | | Tensile elasticity | Thermal | Bending resistance | Bending resistance (after durability |
| | PEEK | PEI | PES | PPSU | GPa 160° C. | resistance | (new) | testing) |
| Comparative example 5 | 70 | 30 | 0 | 0 | 1.08 | OK | OK | NG |
| Embodiment 4-1 | 70 | 0 | 30 | 0 | 1.04 | OK | OK | OK |
| Embodiment 4-2 | 70 | 0 | 0 | 30 | 1.00 | OK | OK | OK |

Due to the matters described above, although the resins are not completely mixed in both embodiments 4-1 and 4-2, since the resins are dispersed in very small units, then it is possible to obtain sufficient mechanical strength. Furthermore, it is thought that, by making the PEEK not mix completely with the amorphous resin, then upon crystallization of the PEEK, the crystal nuclei of the PEEK grow separately from the amorphous resin, and therefore the deterioration due to durability testing is slight.

The structural formulae for PPSU and PES are indicated below. In both cases, the structure includes a sulfonyl group in a main chain. As stated previously, the sulfonyl group includes sulfur and has large polarity. It is inferred that, due to the effects of the electrostatic forces caused by polarization of the sulfonyl group, on the molecular interactions with the PEEK, the compatibility with the PEEK partially becomes incompatible.

[Chemical Formula 2]

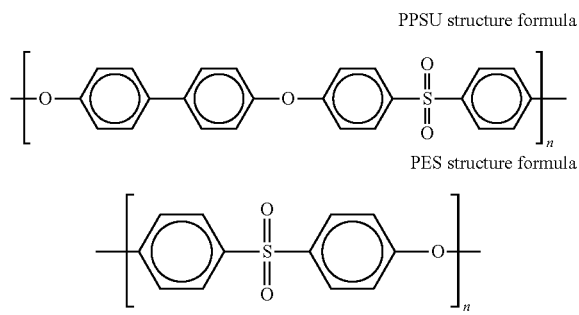

PPSU structure formula

PES structure formula

As described above, by setting the blended resin of crystalline polyaryl ketone resin and PPSU, and the blended resin of crystalline polyaryl ketone resin and PES to a gradual mixed state, the good film formation properties are guaranteed, and it is possible to provide a fixing film showing little deterioration in the bending resistance due to the advance of crystallization when used at high temperatures.

Fifth Embodiment

Figure 14:
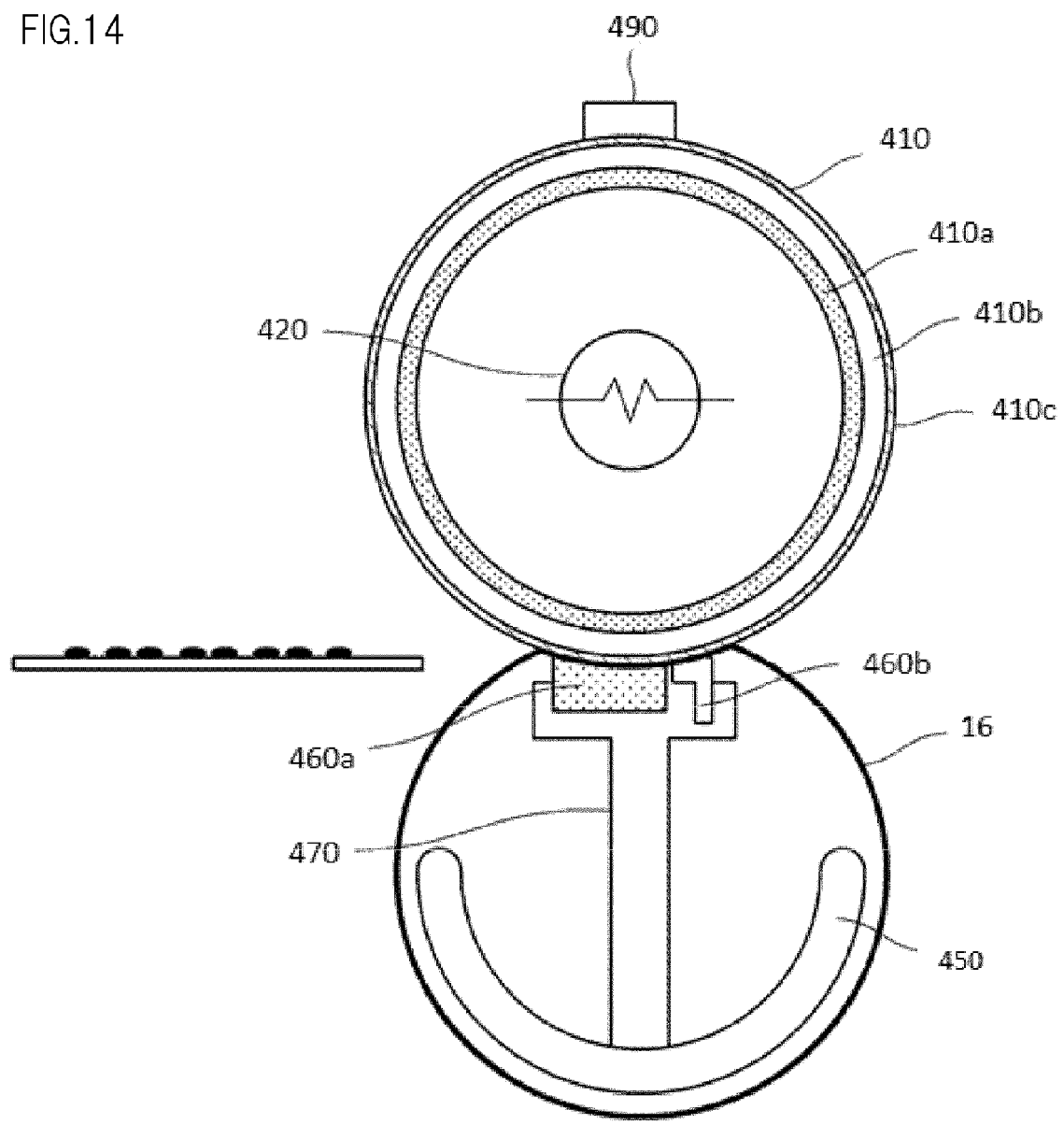
FIG. 14 is a schematic diagram of a fixing apparatus relating to the sixth embodiment.

In the present embodiment, the fixing apparatus used is different. Below, the composition is described with reference to FIG. 14. A fixing roller 410 inside which a heat source 420, such as a halogen lamp, is provided, together with a fixing film 16 which grips and conveys paper by rolling with the fixing roller 410, and a fixing pad 460 which is arranged in contact with the inner circumferential side of a tubular fixing film 16 and which forms a fixing nip N between the fixing roller 410 and the fixing film 16. The fixing pad 460 in the present embodiment is composed by a pressing pad 460a which is a low-pressure pad section disposed on the upstream side, and a fixed pad 460b which is a high-pressure pad disposed on the downstream side having a higher pressing force than the pressing pad 460a, these pads being arranged in a separated state, in such a manner that the fixing nip width is similar from the central portion of the fixing pad 460 to both ends thereof. The pressing pad 460a and the fixed pad 460b are supported by a rigid supporting body 470 having a depressed portion for supporting the pads (460a and 460b), and press the fixing film 16 against the surface of the fixing roller 410 from the rear surface side of the fixing film 16. Moreover, a belt travel guide 45 made from a rigid resin having low thermal conductivity, for example, is provided below the rigid supporting body 470 in order that the fixing film 16 rotates smoothly.

Furthermore, a temperature sensor 490 which measures the surface temperature of the fixing roller 410 is disposed in the periphery of the fixing roller 410, and the temperature of the heat source 420 is controlled by the temperature sensor 49 in such a manner that the surface temperature of the fixing roller 410 becomes a prescribed temperature. There are no particular restrictions on the temperature sensor 490, provided that the sensor is capable of measuring the surface temperature of the fixing roller 410, and it is possible to use a sensor element such as a thermistor, Posistor, or the like, for example.

The fixing roller 410 according to the present embodiment is constituted by a round cylindrical core 410a made from a metal such as aluminum, which has excellent mechanical strength and good thermal conductivity, an elastic layer 410b such as silicone rubber, which is formed on the surface of the core 410a, and a separating layer 410c which is laid on the surface of the elastic layer 410b and is provided in order to prevent offsetting of the unfixed toner image on the paper.

Here, there are no particular restrictions on the material of the core 410a, provided that the material has mechanical strength and good thermal conductivity, and there is no problem in using a metal or alloy such as stainless steel, steel or brass. Furthermore, the elastic layer 410b is not limited to silicone rubber, and provided that the layer has thermal resistance, it is possible to use fluorine rubber, for example. The method for forming the elastic layer 410b on the surface of the core 410a is not limited in particular either, and an injection forming method, a coating method, or the like, may be adopted. Moreover, the separating layer 410c is required to have thermal resistance and be provided with adequate separating properties with respect to toner, and may use fluorine rubber, fluorine resin, or the like, for instance. Furthermore, there are no particular restrictions on the heat source 420 inside the fixing roller 410, provided that the heat source has a shape and a structure that enable accommodation thereof inside the core 410a, and the heat source can be selected appropriately in accordance with the object, without any problem.

(7) Description of Fixing Film 16 Relating to the Present Embodiment

The fixing film according to the fifth embodiment was manufactured similarly to embodiment 3-1, using a blended resin (120 μm thick) of PEEK (Victrex 381G, Tg 143° C.) which is a crystalline polyaryl ketone resin and a PSf (Solvay Advanced Polymers UDEL P-1700, Tg 189° C.) which is an amorphous resin, and as a surface layer 16B, PFA tube (DuPont 450HP) (30 μm thick). In the fifth embodiment, the blend ratio in the base layer 16A was 70 parts by mass of PEEK and 30 parts by mass of PSf, with respect to 100 parts by mass of resin. The average value of the overall thickness of the fixing film 16 was 100 μm. The Tg value of the blended resin in the fixing film according to the fifth embodiment was 148° C. and 180° C. (due to the amorphous resin). Furthermore, the tensile elasticity (100 μm-thick film) in a 160° C. environment was GPa.

In the fixing apparatus according to the present embodiment, a fixing roller 41 having a three-layer structure, and a recording medium, are present between the fixing film 16 and the heat source 42. Therefore, the heat from the heat source 42 is not liable to cause the fixing film 16 to reach a high temperature, due to the effects of the thermal resistance of the member.

Even in the embodiment described above, the blended resin can form a gradual mixed state, there is no problem with thermal resistance and bending resistance, and it is possible to provide a fixing film which shows little deterioration throughout the life of the image-forming apparatus.

Below, the structural formula for PSf is indicated. The PSf also has a structure that includes a sulfonyl group in a main chain. As stated previously, the sulfonyl group includes sulfur and has large polarity. It is inferred that, due to the effects of the electrostatic forces caused by polarization of the sulfonyl group, on the molecular interactions with the PEEK, the compatibility with the PEEK partially becomes incompatible.

[Chemical Formula 3]

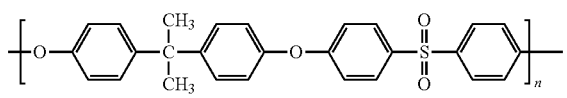

As described above, by achieving a gradual mixed state in the crystalline polyaryl ketone resin and the PSf blended resin, good film forming properties are guaranteed, and it is possible to provide a fixing film in which there is little exacerbation in bending resistance due to the advance of crystallization as a result of use at high temperatures.

Sixth Embodiment

The image-forming apparatus and the fixing apparatus relating to the present embodiment are the same as the first embodiment, and therefore description thereof is omitted here. A thermoplastic endless fixing belt (film) may have an increased degree of crystallinity and a contracted external diameter. After continuous passing of paper of small size, such as A5 paper, there may be virtually no variation of the external diameter in the portion where the paper passes and there may be significant contraction of the external diameter in the portion where the paper does not pass. It is known that, with this film, wrinkles are liable to occur in the paper when paper of large size is passed, such as letter size or A4 paper.

An object of the present embodiment is to provide a fixing belt which can suppress the occurrence of wrinkles in the paper, even if this belt is formed from thermoplastic resin.

The fixing belt according to the sixth embodiment has the following method of manufacture and characteristic features. PEEK (Victrex 381G) was selected as the thermoplastic resin, and was extruded from an extrusion forming apparatus. The extruded resin passes through a ring-shaped die, and upon cooling, is formed into a hollow-shaped belt. In this case, the belt has a lengthwise-direction length of 260 mm, an external diameter of 18.6 mm, and a film thickness of 100 μm, and is in a substantially non-crystallized state.

Next, a primer is applied uniformly to the outer circumferential surface of the belt, and is coated with PFA tube having a film thickness of 30 μm (material: DuPont 950 HP). In this state, the belt is introduced into a furnace at 220° C. (a DN610H air-blower thermostatic tank made by Yamato Scientific Co., Ltd.), calcined for one hour, and the PFA tube and the belt are bonded, simultaneously with which the degree of crystallinity of the PEEK is raised to substantially the maximum saturated degree of crystallinity. Finally, both of the lengthwise ends of the hollow-shaped belt are cut, and the length in the lengthwise direction is formed to 233 mm.

Figure 15:
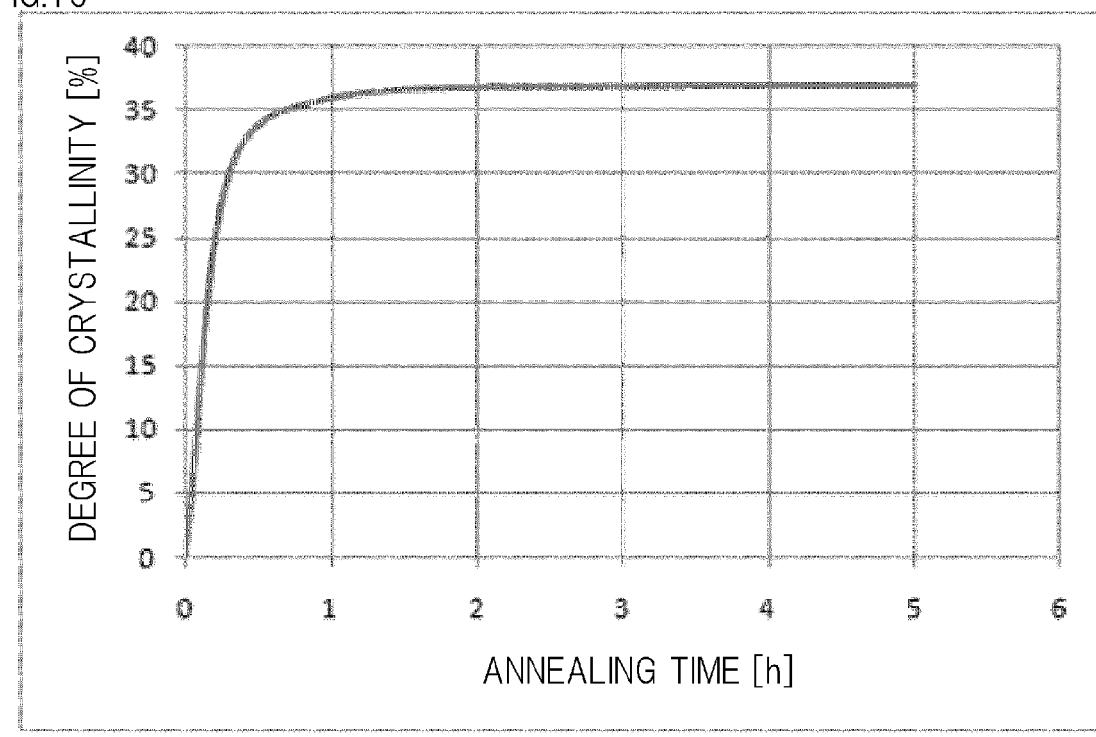
FIG. 15 shows the relationship between the annealing time and the degree of crystallinity.

The maximum saturated degree of crystallinity referred to here means the degree of crystallinity in a case where the PEEK material has been heated sufficiently to the glass transition temperature of the PEEK material or above, and when change in the degree of crystallinity has effectively ceased to occur. FIG. 15 shows the degree of crystallinity of the PEEK material with respect to the time of introduction into the furnace at 220° C. According to FIG. 15, it can be confirmed that the degree of crystallinity is virtually saturated when annealing is carried out for one hour or more. From FIG. 2, it can be determined that the maximum saturated degree of crystallinity in this case is 37%.

In this way, the fixing belt according to the present embodiment is formed by extrusion or injection, and desirably, the formed fixing belt is also subjected to an annealing process. In this annealing process, the fixing belt is calcined for 30 to 300 minutes at a temperature of 143° C. to 250° C. at all times, thereby raising the degree of crystallinity.

The conditions for measuring the degree of crystallinity in the present embodiment are as described below.
Apparatus: Multipurpose X-ray diffraction system: Rigaku Ultima IV
Output: 40 kV-30 mA
Divergence slit: ⅔°
Vertical divergence slit limit: 10.00 mm
Scattering slit: ⅔°
Light-receiving slit: 0.30 mm
Measurement conditions: Concentrated beam method
Measurement rate: 5°/min
Measurement angle range: 2θ=5 to 45°

By the degree of crystallinity measurement described above, diffraction peaks are obtained in both the amorphous portion and the crystalline portion of the PEEK material, and the degree of crystallinity (%) is calculated by Expression (2) below, from the integrated intensity of the peak at the diffraction angle of 2θ=5 to 45°.

Degree of crystallinity($\chi c$)=(integrated intensity of the crystalline portion/integrated intensity of the portion including amorphous and crystalline material(2θ=5 to 45°))×100(%)   Expression (2)

The integrated intensity of the crystalline portion is the sum of the respective integrated intensities of the peaks which appear in the vicinity of 2θ=19° (110 face), the vicinity of 21° (113 face), the vicinity of 23° (200 face), and the vicinity of 29° (213 face).

By the process described above, a fixing belt having a lengthwise-direction length of 233 mm, an external diameter of 18.2 mm, a film thickness of 130 μm, and made from a hollow PEEK material having a degree of crystallinity of 37%, was formed. There are no particular restrictions on the shape of the fixing belt according to the present invention, but desirably, the lengthwise-direction length is 216 to 320 mm and the external diameter is 10 to 40 mm. Furthermore, desirably, the film thickness of the PEEK base material is approximately 50 to 200 μm. Moreover, in the case of a two-layer structure which is covered with PFA tube, as in the fixing belt of the present invention, the PFA tube is desirably approximately 10 to 50 μm.

Furthermore, the fixing belt is installed in a fixing apparatus capable of thermally adhering the toner image to the paper.

Comparative example 6 is shown below.

Comparative Example 6

In a comparative example 6, a fixing belt is manufactured by using PEEK having a degree of crystallinity of 20% as the base material. The method for manufacturing the comparative example 6 is similar to embodiment 6, apart from the fact that the calcination time after extrusion was 5 minutes.

In order to confirm the effects of the present embodiment, embodiment 6 and comparative example 6 were compared as indicated below.

Figure 16:
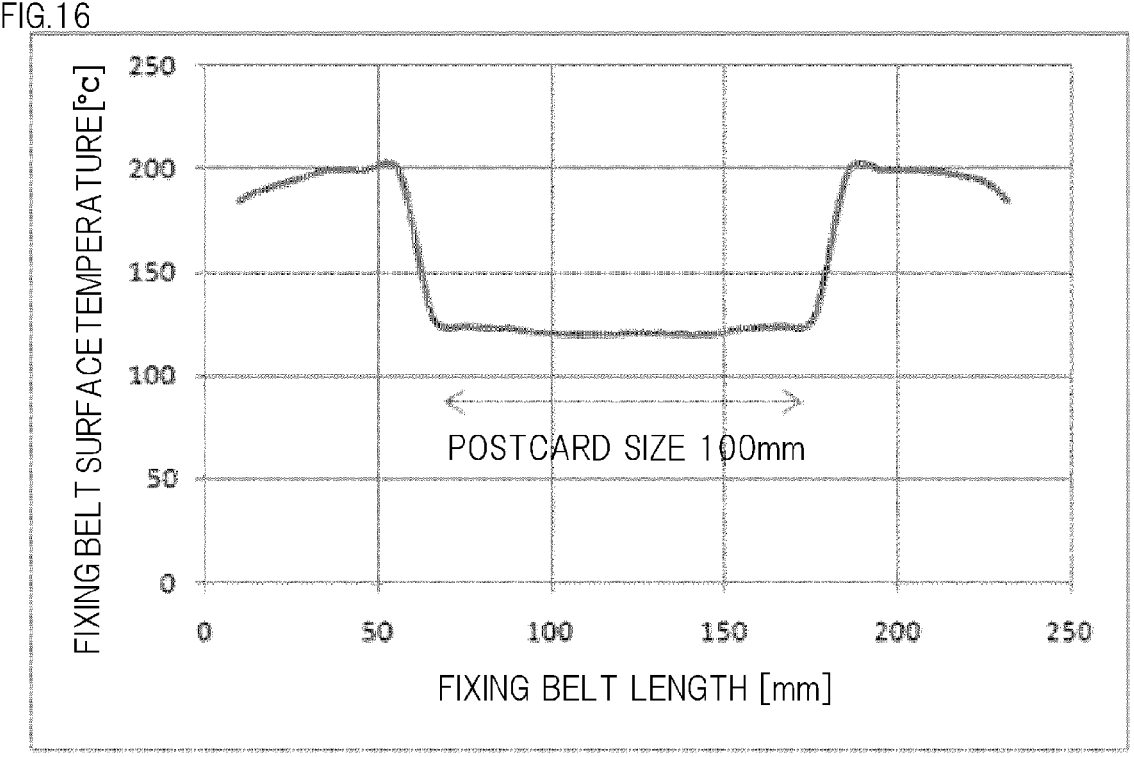
FIG. 16 shows the lengthwise temperature distribution of a fixing belt during the passage of paper.

A total of 1000 postcards were passed through the fixing apparatus shown in FIG. 2, by repeating, 20 times, a 50-sheet continuous passage of postcard paper (100 mm wide by 148 mm high, 209.5 $g/m^2$), at a rotational speed of 150 r/min. Thereupon, 100 sheets of Neenah Bond paper (215.9 mm wide by 279.4 mm high, 60 $g/m^2$) were passed continuously, and the occurrence of wrinkling in the paper was confirmed. Furthermore, the target temperature during the passage of paper was set to 150° C. and the electric power input to the heater was controlled accordingly. FIG. 16 shows the surface temperature distribution of the fixing belt during the passage of paper in this case. The surface temperature of the fixing belt reached approximately 120° C. in the portion where the paper passed, and approximately 200° C. in the portion where the paper did not pass.

Table 5 shows the results of a comparative study of the occurrence of wrinkling in embodiment 6 and comparative example 6. In Table 5, when 100 sheets of Neenah Bond paper were passed continuously, a case where wrinkling occurred, even once, was marked as "X" and a case where no wrinkling occurred was marked as "O". In this case, embodiment 6 was "O" and comparative example 6 was "X". In embodiment 6, the effect of suppressing the occurrence of paper wrinkles due to the contraction of the external diameter of the fixing belt was confirmed.

Figure 17:
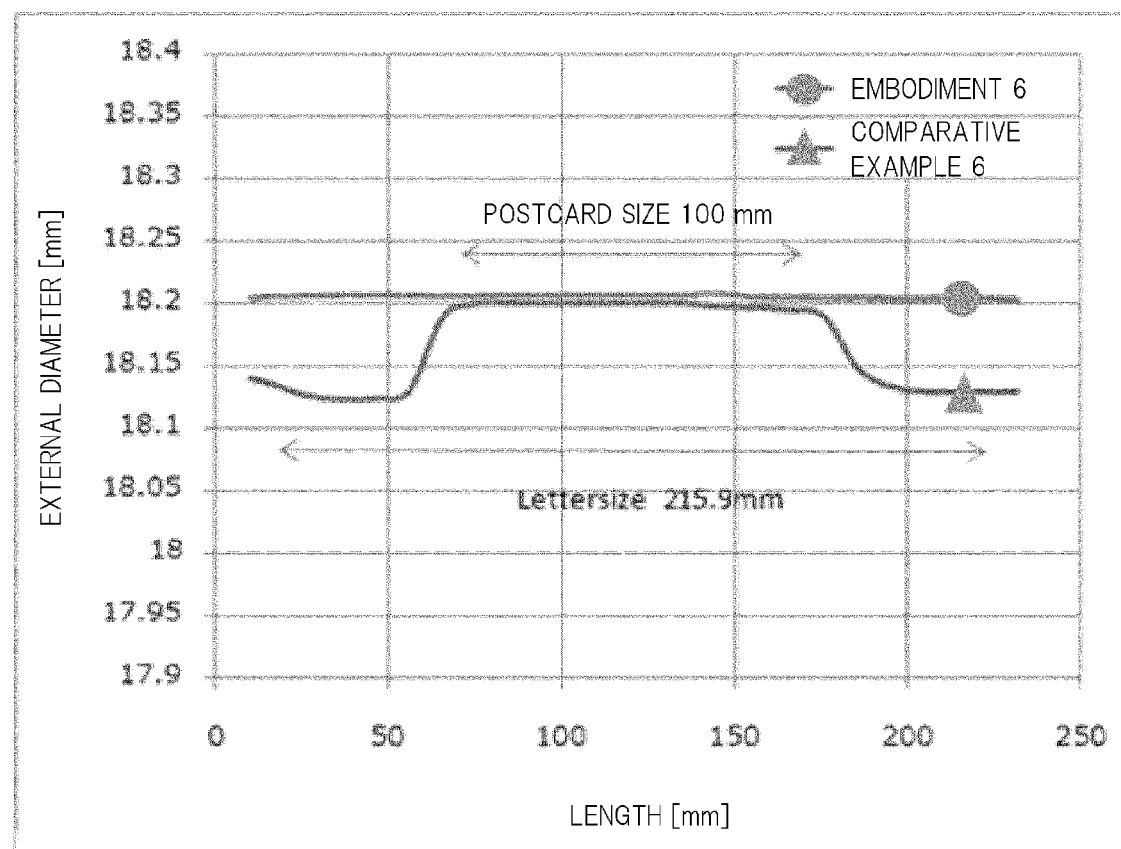
FIG. 17 shows the external diameter distribution of a fixing belt after the passage of paper in the sixth embodiment and a sixth comparative example.
Figure 18:
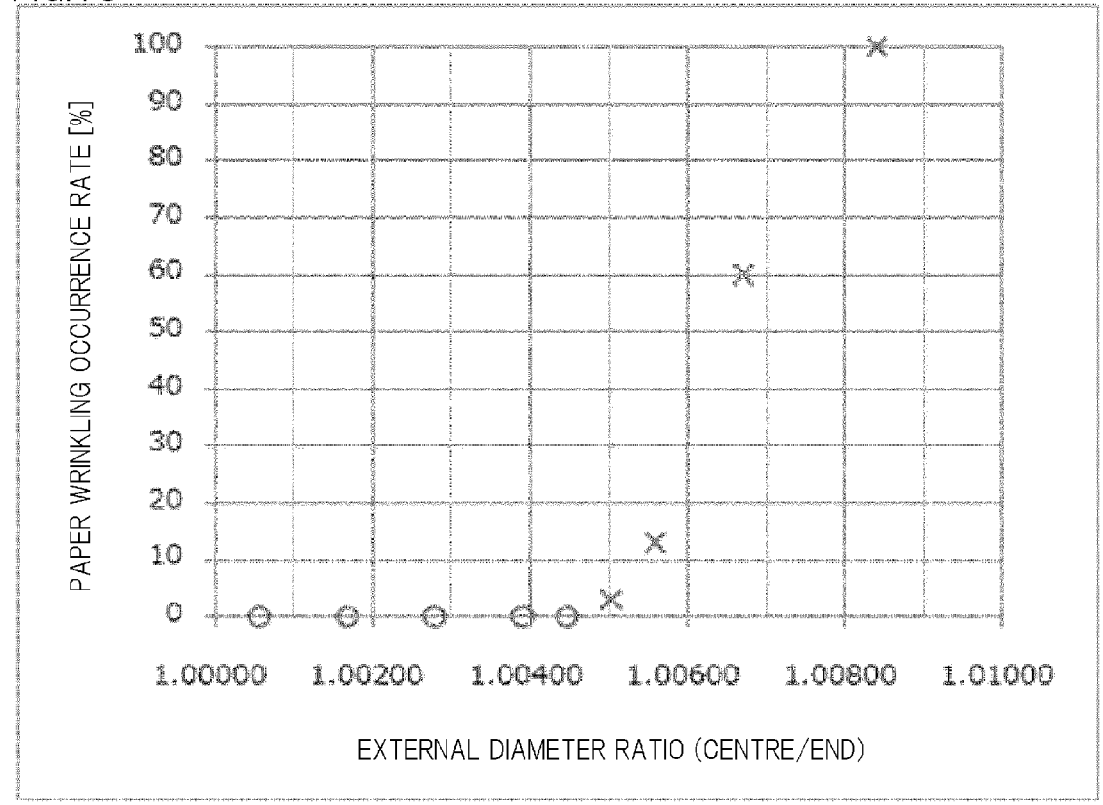
FIG. 18 shows the external diameter ratio of a fixing belt and the rate of occurrence of paper wrinkling.

The mechanism behind the suppression of paper wrinkles in embodiment 1 is described below. FIG. 17 shows the external diameter distribution in the lengthwise direction of the fixing belt after the comparative study between embodiment 6 and comparative example 6. According to this, in embodiment 6, the external diameter was a stable value of 18.2 mm throughout the whole range in the lengthwise direction. On the other hand, in comparative example 6, the external diameter is contracted greatly in the locations other than the portion where the postcard passes. This is because the crystallization of the PEEK in the fixing belt is promoted in the portion where the paper does not pass, and therefore the external diameter difference between the center and the ends of the fixing belt is enlarged, giving rise to paper wrinkles. Next, attention was focused on the external diameter ratio between the center and the ends of the fixing belt, and a case where paper wrinkling occurred was marked "X" and a case where wrinkling did not occur was marked "O". FIG. 18 shows the corresponding relationship between the external diameter ratio and the occurrence rate of paper wrinkling.

According to this, if the external diameter ratio exceeds 1.005 (the external diameter difference between the center and the ends of the fixing belt is 0.5%), then paper wrinkling occurs. The external diameter difference occurs because there is a difference in the speed of movement between the portion of the fixing belt that makes contact with the central portion of the paper, and the portions thereof that make contact with the ends of the paper. As a result of this, if distortion occurs in the paper and this distortion exceeds a prescribed amount, then this distortion is manifested as paper wrinkles. In the present study, thin paper (60 $g/m^2$) which is liable to generate paper wrinkling even with little distortion was passed. Even with paper that differs from that of the present embodiment, provided that the ratio of the external diameter between the center and the ends of the fixing belt (center/end ratio) is less than 1.005 (and desirably, no more than 1.0045), it is considered that the occurrence of paper wrinkling can be suppressed.

Figure 19:
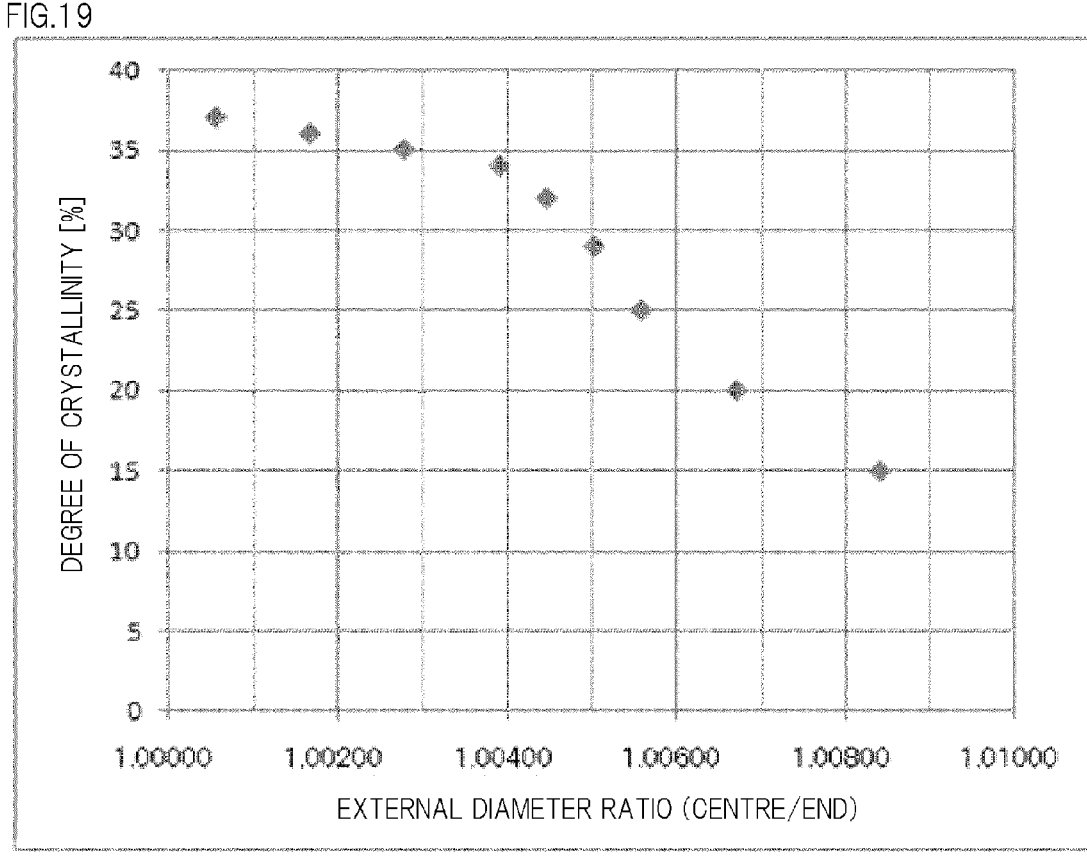
FIG. 19 shows the external diameter ratio of the fixing belt and the degree of crystallinity.
Figure 20:
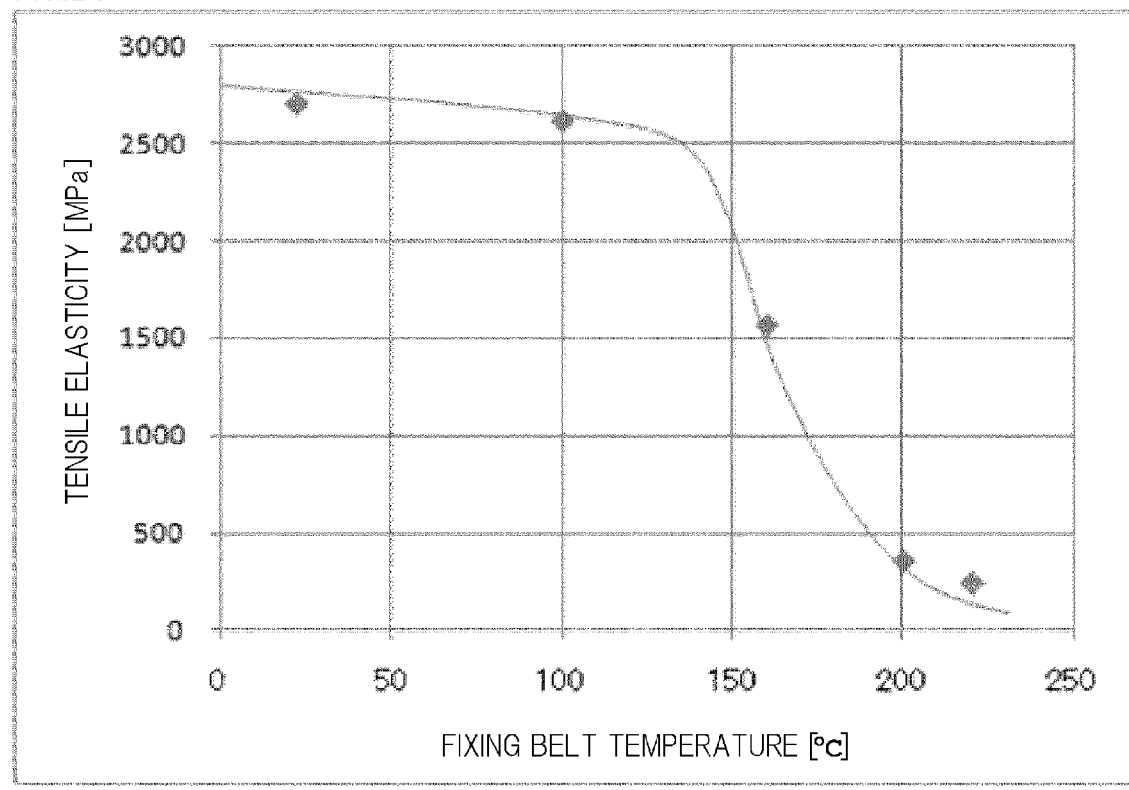
FIG. 20 shows the temperature of the fixing belt and the elasticity of the fixing belt.

FIG. 19 shows the relationship between the degree of crystallinity of the fixing belt after extrusion molding and the external diameter ratio (center/end) between the center and ends of the fixing belt in the lengthwise direction after the passage of paper. According to this, the external diameter ratio (center/end) of the fixing belt can be suppressed to less than 1.005, provided that the degree of crystallinity is not less than 30%. Furthermore, since the maximum saturated degree of crystallization of the PEEK used in embodiment 6 is 37%, then taking a state of saturated crystallization to be 100%, crystallization should proceed to not less than 81%. Consequently, the degree of crystallinity of the crystalline thermoplastic resin used in the fixing belt according to the present embodiment is not less than 81% (and desirably, not less than 86%) of the maximum saturated degree of crystallinity of the crystalline thermoplastic resin. Furthermore, the degree of crystallinity of the crystalline thermoplastic resin used in the fixing belt of the present embodiment is desirably not less than 30% (and more desirably, not less than 32%).

From the results of embodiment 6 and comparative example 6 given above, it can be seen that the occurrence of paper wrinkling can be suppressed by installing, in a fixing apparatus, a fixing belt in which the degree of crystallinity of the crystalline thermoplastic resin used in the fixing belt is not less than 81% with respect to the maximum saturated degree of crystallinity of the crystalline thermoplastic resin material.

Next, in order to confirm the excellent high-temperature behavior in the present embodiment, an explanation is now given of the results of a comparative study into the difference in the bending resistance between a case where a belt material using thermoplastic resin is installed in a fixing apparatus as a fixing belt, and a case where the belt material is installed in a transfer apparatus as an intermediate transfer belt. Therefore, comparative example 7 was prepared and the bending resistance, in other words, the presence or absence of cracking, was compared. Comparative example 7 is described below.

In comparative example 7, a fixing belt was manufactured by using PEEK having a degree of crystallinity of 37% as the base material, similarly to comparative example 6.

The paper passage conditions in comparative example 7 are indicated below. To simulate installation in a transfer apparatus as an intermediate transfer belt, the target temperature was set to 50° C. and the power input to the heater was controlled accordingly. The surface temperature of the fixing belt during the passage of paper in this case reached approximately 35° C. In other words, the conditions did not permit a toner image to be adhered thermally to the paper.

On the other hand, in embodiment 6, it is presumed that the toner image can be adhered thermally to paper, and therefore the target temperature of the fixing apparatus is set to 180° C. and the power input to the heater is controlled. The surface temperature of the fixing belt during passage of paper in this case reaches approximately 150° C., which is a condition that permits the toner image to be adhered thermally to the paper.

In the comparative study, a total of 1000 sheets of paper were passed through the fixing apparatus shown in FIG. 1, by repeating, 20 times, a 50-sheet continuous passage of Neenah Bond (215.9 mm wide by 279.4 mm high, 60 g/m$^2$), at a rotational speed of 150 r/min.

Table 5 shows the results of a comparative study of the occurrence of cracking in embodiment 6 and comparative example 7. When a case where cracks occurred in the fixing belt was marked as "X" and a case where cracks did not occur was marked as "O", then embodiment 6 was marked "O" and comparative example 7 was marked "X". From the above, in embodiment 6, it was confirmed that the bending resistance was satisfied and cracking could be suppressed, by installing a fixing belt made from a PEEK material in a fixing apparatus which thermally adheres a toner image to paper.

Here, the difference in bending resistance is considered in relation to embodiment 6 and comparative example 7. FIG. 7 shows the relationship between the temperature of the fixing belt and the tensile elasticity of the fixing belt in this case. According to this, the tensile elasticity of the fixing belt declines greatly from the point where the temperature of the fixing belt exceeds 143° C., which is the glass transition temperature (Tg) of the belt material. Furthermore, it is generally known that the tensile elasticity has a significant correlation with the bending resistance.

In embodiment 6, rotational operation is carried out in a temperature range in which the toner image can be melted, in other words, a state where the tensile elasticity of the fixing belt is low, and therefore the bending resistance is excellent. On the other hand, in comparative example 7, the rotational operation is carried out in a temperature range in which the toner image cannot be melted, in other words, a state where the tensile elasticity of the fixing belt is high, and this exacerbates bending resistance and therefore leads to cracking. In this way, the fixing belt according to the present invention is desirably used in a temperature range in which the toner image can be melted (80° C. to 140° C.), and especially desirably, is used at or above the glass transition temperature of the crystalline thermoplastic resin of the fixing belt.

Table 5 shows a summary of the results of the comparative study of embodiment 6, comparative example 6 and comparative example 7.

TABLE 5

|  | Paper wrinkling | Cracks |
|---|---|---|
| Embodiment 6 | O | O |
| Comparative Example 6 | X | O |
| Comparative Example 7 | O | X |

In a fixing belt used in a temperature range in which the toner image can be melted, it was confirmed that there is no need to be particularly concerned about deterioration of the bending resistance due to increase in the degree of crystallinity as has been envisaged in the prior art. Therefore, in embodiment 1, a fixing belt having a resin layer formed from a thermoplastic resin that can be manufactured inexpensively, is installed in a fixing apparatus, and the occurrence of paper wrinkles caused by contraction of the external diameter of the fixing belt can be suppressed, at the same time as satisfying the bending resistance.

In embodiment 6, although a fixing belt having a resin layer made from PEEK which is a crystalline thermoplastic resin is used, in the present embodiment, it is also possible to expect similar results when using a resin belonging to the same type of aromatic ether ketones. For example, it is possible to use a belt made from at least one or at least two or the following crystalline thermoplastic resins: polyether ketone (PEK), polyether ether ketone (PEEK), polyether ketone ether ketone ketone (PEKEKK), polyether ketone ketone (PEKK), polyaryl ether ketone ether ketone ketone (PAEKEKK), polyaryl ether ketone (PAEK), polyaryl ether ether ketone (PAEEK), polyether ether ketone ketone (PEEKK), polyaryl ether ketone ketone (PAEKK), and polyaryl ether ether ketone ketone (PAEEKK). Of these, PEEK, PEK or PEKEKK is desirable.

Furthermore, even in a case where an additive or crystalline resin, or the like, is blended with the crystalline thermoplastic resin, it is possible to display a similar action and effects. Since the measurement value of the degree of crystallinity varies with the blend ratio, then in the case of a blended material, by ascertaining the maximum saturated degree of crystallinity in this blended material and specifying the degree of crystallinity with respect to the maximum saturated degree of crystallinity, the action and effects indicated in embodiment 6 can be displayed, needless to say, and detailed description thereof is omitted here. The fixing belt according to the present embodiment has a layer including a crystalline thermoplastic resin, but may also have a two-layer structure. For instance, a layer including a crystalline thermoplastic resin may be used as a base material, and a resin, such as perfluoro alkoxy alkane (PFA), may be coated onto the outer circumferential surface of the layer including the crystalline thermoplastic resin. The coating resin may be one selected from a group consisting of perfluoro alkoxy alkane (PFA), polytetra fluoroethylene (PTFE), and the like.

Seventh Embodiment

Description of Apparatus

Figure 21:
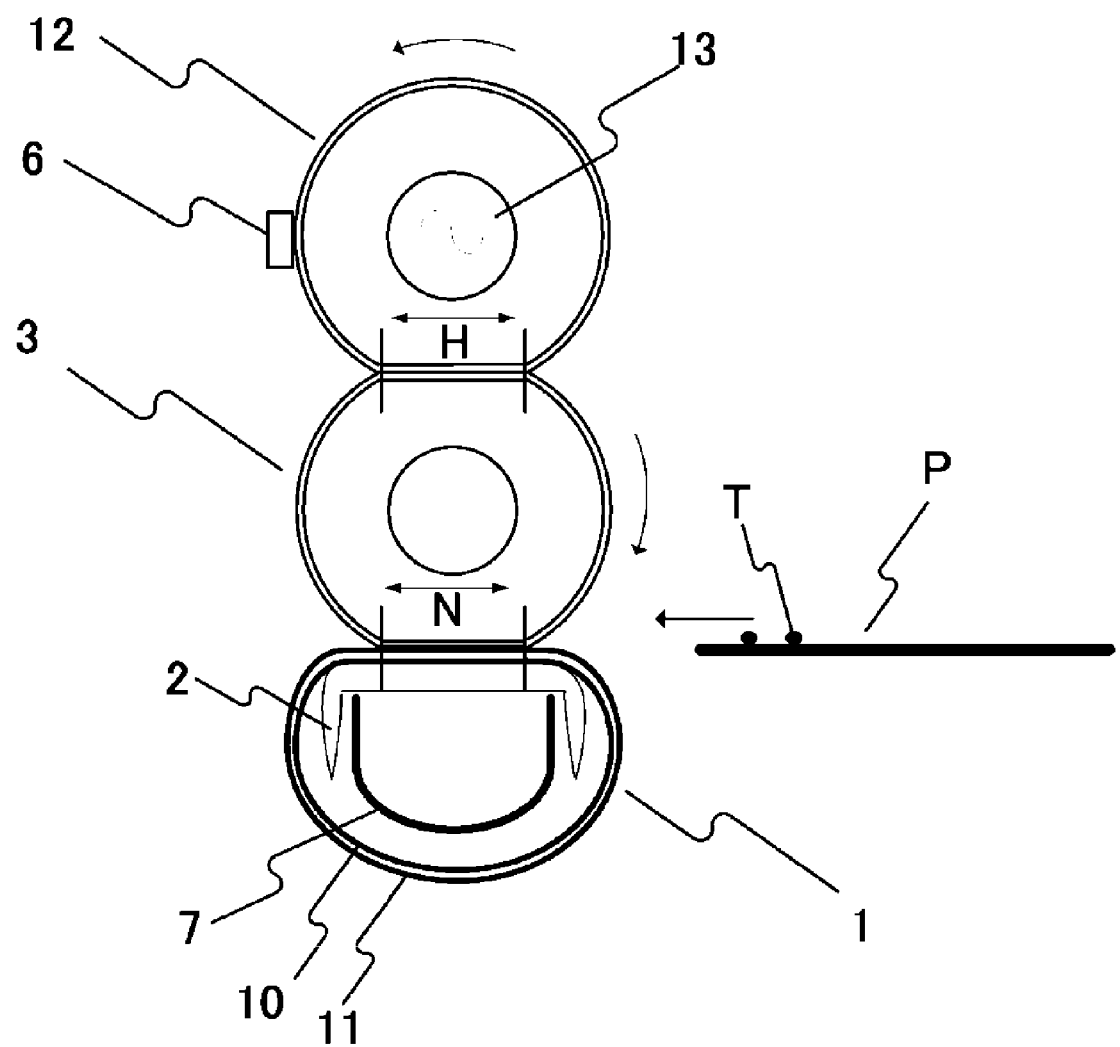
FIG. 21 is a cross-sectional diagram of a fixing apparatus relating to a seventh embodiment.

FIG. 8 shows a cross-sectional diagram of a fixing apparatus in the seventh embodiment, and an overview of the apparatus will be described. In the present embodiment, a surface heating fixing apparatus shown in FIG. 21 is used. In the present composition, the fixing belt 1 forms a fixing nip N with the pressurizing roller 3, the surface of the pressurizing roller 3 is surface-heated by a separate heat roller, and this heat is supplied to the recording material and the toner image T, thereby performing a fixing operation.

A heat roller 12 which incorporates a halogen heater 13 as a heating source is pressed against the pressurizing roller 3, thereby forming a hot pressure nip H. A fixing nip N is formed by the contact portion between the fixing belt 1 and the pressurizing roller 3, and when paper P bearing a toner image T is passed through this fixing nip N, the toner image on the paper P can be heated and fixed.

The belt guide 2 is formed by heat resistant resin, such as liquid crystal polymer, PPS, PEEK, or the like, and the end portions in the lengthwise direction are coupled with fixing stays 7 which are supported on the apparatus frame.

Pressurizing springs (not illustrated) apply pressure to the ends of the fixing stays 7 in the lengthwise direction, whereby the belt guide 2 is pressurized towards the side of the pressurizing roller 3. In this case, the pressurizing force applied to the pressurizing roller 3 is 160N and the fixing nip N in this case is 6 mm. In order that the fixing stays 7 transmits the pressurizing force received by both ends of the lengthwise direction, in a uniform fashion in the lengthwise direction of the belt guide 2, a rigid material such as iron, stainless steel, pre-coated (on the basis of Zinkote) steel plate, or the like, is used, and the rigidity is increased by adopting a square U-shaped cross-sectional shape.

Pressing sections (not illustrated) in both end portions of the heat roller 12 are pressed by pressurizing springs, and are pressurized against the pressurizing roller 3. In this case, the pressurizing force applied to the pressurizing roller 3 is 160 N.

The temperature sensing element 6 contacts the surface of the heat roller 12, and the temperature of the fixing apparatus, in other words the input power of the halogen heater 13, is controlled in accordance with the sensing temperature of the temperature sensing element 6.

In this fixing apparatus, the pressurizing roller 3 and the heat roller 12 rotate due to driving force from a motor (not illustrated) which transmits motive power to the pressurizing roller 3 and/or heat roller 12, the paper P is conveyed by the frictional force acting between the surface of the pressurizing roller 3, the fixing belt and the paper P, and the toner is heated and fixed.

The fixing apparatus used in this case differs from the fixing apparatus shown in FIG. 2 in that the heat roller, which is the heating source, and the fixing belt do not make direct contact with each other. In the present case, even with a fixing apparatus of this kind, the occurrence of paper wrinkles is suppressed and the occurrence of cracks due to the bending resistance can also be suppressed.

Below, embodiment 7 is described. The fixing belt used was a fixing belt manufactured similarly to embodiment 6, having a lengthwise-direction length of 233 mm, an external diameter of 18.2 mm, a film thickness of 130 μm, and made from a hollow PEEK material having a degree of crystallinity of 37% and PFA.

The composition of the pressurizing roller 3 in embodiment 7 is now described. A balloon rubber layer was formed to a thickness of 3.4 mm on an 11 mm-diameter steel core, a 150 μm-thick layer of rubber having high thermal conductivity was layered thereon, and further covered with 10 μm-thick insulating PFA tube, the hardness being 56 degrees. The length of the elastic layer and the separating layer in the lengthwise direction was 229 mm.

In embodiment 7, the presence or absence of paper wrinkles was confirmed under the following conditions. A total of 1000 postcards were passed, by repeating, 20 times, a 50-sheet continuous passage of postcard paper (100 mm wide by 148 mm high, 209.5 g/m$^2$), at a rotational speed of 150 r/min. Thereupon, 100 sheets of Neenah Bond paper (215.9 mm wide by 279.4 mm high, 60 g/m$^2$) were passed continuously, and the occurrence of wrinkling in the paper was confirmed. Furthermore, the target temperature during the passage of paper was set to 220° C. and the electric power input to the heater was controlled accordingly. The surface temperature of the fixing belt during this passage of the paper reached approximately 130° C. in the portion where the paper passed and reached approximately 200° C. in the portion where the paper did not pass.

Upon confirming the presence or absence of paper wrinkling in this case, it was found that paper wrinkling did not occur. Furthermore, the external diameter ratio (center/end) between the center and the ends of the fixing belt was 1.0005, and could thus be kept at or below a value of 1.0045 at which a wrinkle suppressing effect is obtained.

Next, the presence or absence of cracking due to the passage of paper was confirmed. As regards the paper passage conditions, the target temperature during the passage of paper in the fixing apparatus was set to 220° C. and the electric power input to the heater was controlled accordingly. Furthermore, after reaching the target temperature, control was implemented to start the passage of paper to the fixing apparatus. In this case, the temperature of the fixing belt reached 150° C. Furthermore, the paper which was passed at a rotational speed of 150 r/min in the fixing apparatus was Neenah Bond paper (215.9 mm wide by 279.4 mm high, 60 g/m$^2$), and a 50-sheet paper passage operation was repeated 20 times, thereby passing a total of 1000 sheets, as a result of which there was no occurrence at all of cracks in the fixing belt.

From the above, even in a system in which the heating source and the fixing belt make no contact, as in the fixing apparatus of embodiment 7, a fixing belt using a thermoplastic resin which can be manufactured inexpensively is installed in a fixing apparatus, and the occurrence of paper wrinkles due to contraction of the external diameter of the fixing belt can be suppressed, at the same time as satisfying the bending resistance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-178924, filed Aug. 30, 2013, No. 2013-178925, filed Aug. 30, 2013, and No. 2013-178926, filed Aug. 30, 2013 which are hereby incorporated by reference herein in their entirety.

What is claimed is:

1. A cylindrical film used in an image heating device heating a recording material on which an image has been formed, the cylindrical film comprising:
   a resin layer, the resin layer being made from a resin in which a crystalline resin and an amorphous resin having a higher glass transition temperature than that of the crystalline resin are blended,
   wherein a volume ratio of the crystalline resin with respect to the amorphous resin in the resin layer is 70/30 to 99/1.

2. The film according to claim 1, wherein the crystalline resin is crystalline polyaryl ether ketone.

3. The film according to claim 2, wherein the amorphous resin is a resin having a sulfonyl group.

4. The film according to claim 3, wherein the amorphous resin is sulfonated polyether imide.

5. An image heating device performing a heating process for heating while conveying a recording material on which an image has been formed in a nip portion, comprising:
   a cylindrical film, the film having a resin layer made from a resin in which a crystalline resin and an amorphous resin having a higher glass transition temperature than that of the crystalline resin are blended;
   a nip portion forming member that contacts an inner surface of the film; and a back-up member that forms the nip portion together with the nip portion forming member, via the film, wherein a volume ratio of the crystalline resin with respect to the amorphous resin in the resin layer is 70/30 to 99/1.

6. The image heating device according to claim 5, further comprising a heating member, the film being heated by heat from the heating member, wherein the image heating device controls the heating member such that a temperature of the film during a heating process is higher than the glass transition temperature of the crystalline resin and lower than the glass transition temperature of the amorphous resin.

7. The image heating device according to claim 5, wherein the crystalline resin is crystalline polyaryl ether ketone.

8. The image heating device according to claim 7, wherein the amorphous resin is a resin having a sulfonyl group.

9. The image heating device according to claim 8, wherein the amorphous resin is sulfonated polyether imide.

10. The image heating device according to claim 5, wherein the back-up member is a roller, and wherein the heating device has a heating member that heats the roller by making contact with an outer circumferential surface of the roller.

11. The image heating device according to claim 5, further comprising a halogen heater incorporated in the film.

12. The image heating device according to claim 5, wherein the nip portion forming member is a plate-shaped heater.

13. A cylindrical film used in an image heating device heating a recording material on which an image has been formed, comprising:

a blended resin layer in which crystalline polyaryl ketone and an amorphous resin having a higher glass transition temperature than that of the crystalline polyaryl ketone are blended, wherein the blended resin layer has two or more glass transition temperatures measured by differential scanning calorimetric measurement.

14. The film according to claim 13, wherein a glass transition temperature of the blended resin layer due to the amorphous resin measured by differential scanning calorimetric measurement is lower than that of the amorphous resin before the amorphous resin is blended with the crystalline polyaryl ketone.

15. The film according to claim 13, wherein a tensile elasticity of the blended resin layer is higher than that of the crystalline polyaryl ketone before the crystalline polyaryl ketone is blended with the amorphous resin.

16. The film according to claim 13, wherein the amorphous resin is a resin having a sulfonyl group.

17. The film according to claim 16, wherein the amorphous resin is sulfonated polyether imide.

18. The film according to claim 13, wherein the amorphous resin is a resin made from any one or at least two of polyether sulfone, polyphenyl sulfone and polysulfone.

19. The film according to claim 13, wherein the crystalline polyaryl ketone is a resin made from any one or at least two of polyether ether ketone, polyether ketone, polyether ketone ether ketone ketone, polyether ketone ketone, polyaryl ether ketone ether ketone ketone, polyaryl ether ketone, polyaryl ether ether ketone, polyether ether ketone ketone, and polyaryl ether ketone ketone.

20. A cylindrical film used in an image heating device heating a recording material on which an image has been formed, comprising:

a resin layer made from a crystalline thermoplastic resin, a degree of crystallinity of the resin layer being not less than 81% of a maximum saturated degree of crystallinity of the crystalline thermoplastic resin.

21. The film according to claim 20, wherein the degree of crystallinity of the crystalline thermoplastic resin is not less than 30%.

22. The film according to claim 20, wherein the crystalline thermoplastic resin is a resin made from any one or at least two of polyether ether ketone, polyether ketone, and polyether ketone ether ketone ketone.

* * * * *